(12) United States Patent
Ramachandran

(10) Patent No.: US 10,413,824 B2
(45) Date of Patent: Sep. 17, 2019

(54) MULTI-DEVICE COOPERATIVE SCOREKEEPING

(71) Applicant: Apple Inc., Cupertino, CA (US)

(72) Inventor: Prashanth Ramachandran, Foster City, CA (US)

(73) Assignee: Apple Inc., Cupertino, CA (US)

( * ) Notice: Subject to any disclaimer, the term of this patent is extended or adjusted under 35 U.S.C. 154(b) by 483 days.

(21) Appl. No.: 15/117,323

(22) PCT Filed: Feb. 11, 2014

(86) PCT No.: PCT/US2014/015704
§ 371 (c)(1),
(2) Date: Aug. 8, 2016

(87) PCT Pub. No.: WO2015/122873
PCT Pub. Date: Aug. 20, 2015

(65) Prior Publication Data
US 2016/0346690 A1 Dec. 1, 2016

(51) Int. Cl.
*A63F 13/46* (2014.01)
*A63F 13/30* (2014.01)
(Continued)

(52) U.S. Cl.
CPC .......... *A63F 13/46* (2014.09); *A63B 71/0669* (2013.01); *A63F 13/12* (2013.01); *A63F 13/25* (2014.09); *A63F 13/34* (2014.09); *A63F 2300/408* (2013.01); *A63F 2300/5533* (2013.01); *A63F 2300/5573* (2013.01); *A63F 2300/61* (2013.01); *A63F 2300/69* (2013.01)

(58) Field of Classification Search
None
See application file for complete search history.

(56) References Cited

U.S. PATENT DOCUMENTS

2007/0129179 A1\* 6/2007 Soto .................. A63B 71/0669
473/407
2009/0259566 A1 10/2009 White, III et al.
(Continued)

FOREIGN PATENT DOCUMENTS

WO 2007/092461 A2 8/2007

OTHER PUBLICATIONS

International Application No. PCT/US2014/015704, International Preliminary Report on Patentability dated Aug. 25, 2016, 9 pages.
(Continued)

*Primary Examiner* — Ronald Laneau
(74) *Attorney, Agent, or Firm* — Kilpatrick Townsend & Stockton LLP

(57) ABSTRACT

Electronic devices can facilitate collective and accurate scorekeeping. A first electronic mobile device can communicate (directly or indirectly) with a second electronic mobile device. Respective users can use the devices to identify when and/or how a score is to be adjusted. The input can be processed at a mobile device or central server to determine whether and/or how to adjust a score. Score adjustment can depend on whether any other input includes inconsistent information. The score adjustments can be pushed to one or more mobile devices. In this manner, all mobile devices can display a consistent and current score.

17 Claims, 11 Drawing Sheets

(51) Int. Cl.
*A63F 13/25* (2014.01)
*A63F 13/34* (2014.01)
*A63B 71/06* (2006.01)

(56) References Cited

U.S. PATENT DOCUMENTS

2012/0255482 A1* 10/2012 Terenzoni .......... A63B 71/0672
116/223
2016/0214008 A1* 7/2016 Heck .................... A63F 13/828

OTHER PUBLICATIONS

"Mobile Tennis Scoring—Detailed Statistics—Live Broadcast—Tennis Score Tracker." Downloaded from http://www.tennisscoretracker.com/ on Nov. 14, 2013. 6 pages.
Score Band, "Flat $5 Shipping within the U.S." Downloaded from http://www.scoreband.net/ on Nov. 14, 2013. 3 pages.
Blog: (/blog), "Real-Time Tracking iPhone App Perfect for Marathoners." Downloaded from http://www.revelmob.com/blog/real-time-tracking-iphone-app-perfect-marathoners on Nov. 14, 2013. 2 pages.
"Game Center Programming Guide," developed by Apple Inc. Oct. 22, 2013. 152 pages.
International Search Report and Written Opinion dated Jul. 1, 2014 in International Application No. PCT/US2014/015704. 12 pages.

* cited by examiner

MULTI-DEVICE COOPERATIVE SCOREKEEPING

CROSS-REFERENCES TO RELATED APPLICATIONS

This application is the U.S. National Phase of PCT Application No. PCT/US2014/015704, filed Feb. 11, 2014, which is hereby incorporated by reference in its entirety for all purposes.

BACKGROUND

The present disclosure relates generally to inter-device communications indicative of a performance during an activity and in particular to tracking a score of an athletic game using inputs from devices of different users.

People of all ages enjoy playing a variety of sports. Sports are varied as to what action is rewarded with a score increment and what the score increment will be. Amateur scorekeepers, for example, can struggle to follow scoring rules for a game like tennis, where not every serve will result in award of a point, point increments are not fixed, and a non-fixed number of sets are to be played to determine the ultimate winner. Beyond the complications of scorekeeping itself, frequently, players are responsible for tracking the score. Game play thus further acts as a distractant towards accurate score tallying. Further yet, in multi-player games, the question arises as to who is going to keep score and as to when and how a score-award discrepancy is to be identified and handled.

Mentally keeping score can be prone to errors, while keeping score on paper can distract a player from a game. Further, each technique isolates scorekeeping from other players. Thus, if there is a disagreement about a given point, a given player can be unaware of the disagreement. Verbally keeping score can also be error-prone, and discussions can slow the game's progress.

SUMMARY

In some embodiments, a first electronic device can receive a first communication from a second electronic device and can update a tracked parameter (e.g., a score) of a game based on the first communication. The first electronic device can cause the tracked parameter of the game to be displayed and can receive an indication that the tracked parameter of the game is to be changed. The indication can be received from a device other than the second electronic device. The first electronic device can send a second communication to the second electronic device reflecting the indication that the tracked parameter of the game is to be changed.

In some embodiments, a communication channel can be established between a first electronic mobile device and a second electronic mobile device. The first electronic mobile device can generate a representation of a sports game. The representation can be indicative that each of a first user of the first electronic mobile device and a second user of the second electronic mobile device is a player in the sports game. The first electronic mobile device can receive a communication from the second electronic mobile device and can modify a parameter for the sports game based on the communication. The modified parameter can be presented in association with the representation of the sports game on the first electronic mobile device.

Some embodiments relate to an electronic device that can include an input component, an output component configured to transmit communications to other devices, and one or more processors coupled to the input component and to the output component. The electronic device can also include a computer-readable storage medium containing instructions, that, when executed by the one or more processors, cause the one or more processors to perform actions including receiving a first communication from a second electronic device and updating a tracked parameter of a game based on the first communication. The actions can also include causing the tracked parameter of the game to be displayed and receiving, via the input component, an indication that the tracked parameter of the game is to be changed. The indication can be received from a device other than the second electronic device. The actions can further include sending, via the output component, a second communication to the second electronic device reflecting the indication that the tracked parameter of the game is to be changed.

Some embodiments relate to an electronic device that include an input component configured to receive communications from other devices, an output component configured to transmit communications to other devices, a display and one or more processors coupled to the input component and to the output component. The electronic device can also include a computer-readable storage medium containing instructions, that, when executed by the one or more processors, cause the one or more processors to perform actions including establishing a communication channel between the electronic mobile device and a second electronic mobile device and generating a representation of a sports game. The representation can be indicative that each of a first user of the electronic mobile device and a second user of the second electronic mobile device is a player in the sports game. The actions can also include receiving, via the input component, a communication from the second electronic mobile device and modifying a parameter for the sports game based on the communication. The actions can further include presenting the modified parameter association with the representation of the sports game on the display.

The following detailed description together with the accompanying drawings will provide a better understanding of the nature and advantages of the present invention.

DETAILED DESCRIPTION

Figure 1:
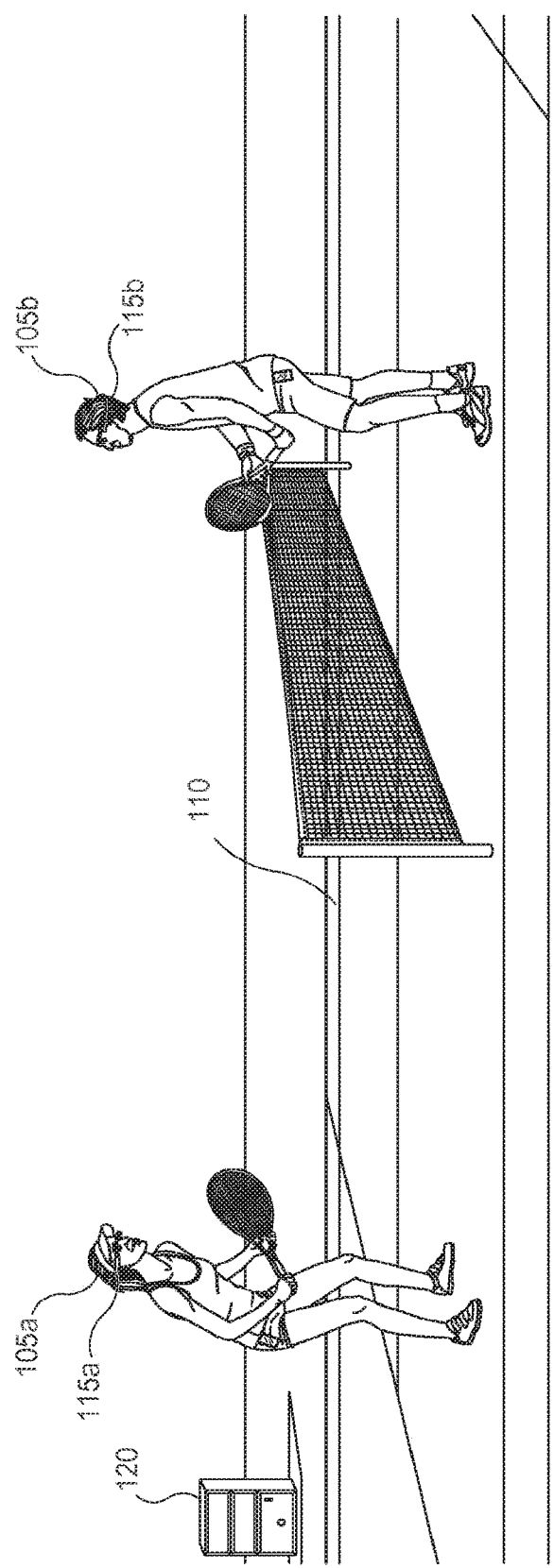
FIG. 1 shows an example of multiple users engaging in an athletic sport and using their wearable devices to track their score.

Certain embodiments of the present invention can facilitate collective and accurate scorekeeping. A first electronic mobile device worn by or attached to one user can communicate (directly or indirectly) with a second electronic mobile device worn by or attached to another user. Each mobile device can be a wearable device, such as a pair of glasses, a necklace, a head band, a clip, an armband, a belt, a watch, or the like. Respective users can use the devices to identify when and/or how a score is to be adjusted. For example, a basketball player can indicate that a player on his team made a three-point shot. The input can be processed at a mobile device or server (e.g., located at a game location or remotely) to determine whether and/or how to adjust a score. This analysis can depend on whether any other input includes inconsistent information (e.g., input from another device that denies the point, indicates that a different player scored a point or indicates that a point was of a different magnitude). The score adjustments can be pushed to one or more mobile devices. In this manner, all mobile devices can display a consistent and current score.

In some embodiments, a first device (e.g., a smart wearable device, such as a pair of glasses, a head bands, a clip, an armband, a belt and/or a watch) of a first user can be paired (or otherwise communicate) with second device of a second user. The first user can, for example, identify the second device by searching for a particular user or selecting a nearby device (e.g. associated with a particular quality, such as a skill ranking similar to that of the first user). As another example, a pair request can be automatically sent to one or both users after it is detected that they are on or near a same sporting location (e.g., court, field or track).

Once paired, an initial score (e.g., 0-0) can be presented on each paired device. One or both of the first and second devices can include a point-reporting input device and can allow a user to report a point and (in some or instances) thereby influence a score. Which of the users' devices provides this opportunity can depend on a fixed ride (e.g., such that all paired devices accept score-adjusting input, or such that a device associated with a server receiving player is a device designated to receive a report of a point for the serve), a user-defined rule and/or user input (e.g., such that one or more users can claim, transfer and/or accept a device designation of being a point-reporting input device). The input can include, e.g., a player or team to be credited with a point, a magnitude of the point, and/or details that gave rise to the point (e.g., a team member credited with the point and/or a type of baseball pitch or tennis serve preceding the point).

Score adjustments can be handled by a score-adjusting device. One or more user devices can act as a score-adjusting device. For example, a device that receives point-reporting input can determine whether and/or how to adjust the score and can adjust the score accordingly. As another example, a point-reporting input device can identify input details to another user device (e.g., to provide another user with an opportunity to protest score adjustment), and the other user device can handle any score adjustment. In some instances, a central server (e.g., located near a sporting location) handles score adjustments.

In some instances, the score is automatically adjusted upon receiving a score-changing input, in other instances, consideration is first provided to determine whether contrary input from another player has been or will be received. For example, a delay can be used, such that a score adjustment is made if no contrary input is received during a time period of the delay.

A rule (e.g., a fixed, venue-defined or user-defined rule) can define handling of contrary inputs. The Rile can indicate, e.g., that no point is to be allocated in dispute situations or that a point of intermediate magnitude is to be allocated to the alleged point recipient. In some instances, the rule accesses a hierarchy to determine which user's input prevails. The hierarchy can be structured to rank particular users, qualities of users (e.g., to favor inputs from users with higher skill ranking or to favor inputs from users estimated to have been closer to the disputed sport action potentially having given rise to the point) and/or qualities of input (e.g., to favor first-received input).

Score updates can be sent from the score-adjusting device to one or more user devices. For example, a server computer (e.g., one located at a game location or a remote server) can push an updated score to all user devices subsequent to each score adjustments. Score-adjustment details can further be stored (e.g., on a user device or server or on another device, such as a remote storage unit), which can then be used to analyze performance of particular users.

FIG. 1 shows two players 105a and 105b playing tennis on a tennis court 110. Each player 105a, 105b can wear or have attached to their body, a mobile electronic device 115a, 115b. As described in further detail herein, players 105a and 105b can use devices 115a and 115b to view and adjust a score of their tennis match. It will be appreciated that each player is thus also a user of a device. Thus, the terms "user" and "player" can be used interchangeably herein.

Devices 115a and 115b can communicate directly (e.g., over a Bluetooth connection or BT-LE connection) or indirectly. For example, each device can communicate (e.g., over a Bluetooth connection of BT-LE connection) with a server 120, which can be located near tennis court 110. It will be appreciated that, as used herein, a server can refer to a server computer. As another example, the devices may communicate directly with each other or with a server over a cellular data network.

Player 105a can indicate that a point has been scored by entering input into mobile device 115a. Device 115a can generate and transmit a first communication to server 120 and/or device 115b. The first communication can include information pertaining to the input (e.g., which player was identified as scoring the point) and/or can include a modified score. When the first communication is transmitted to server 120, server 120 can subsequently alert device 115b of any score change responsive to the input.

Subsequently, player 105b can indicate that another point has been scored by entering input into mobile device 115b. Device 115b can generate and transmit a second communication (again with information pertaining to the input and/or including a modified score) to server 120 and/or device 115a. Again, when the second communication is transmitted to server 120, server 120 can subsequently alert device 115a of any score change responsive to the input.

Thus, either player 105a or 105b can record a point, which can reduce the possibility that a given point goes unrecorded. In some instances, a device can estimate, based on an analysis of data collected by one or more sensors on the device, that a score (or other event, such as a "let") occurred. One or more users can then be alerted of the event detection and/or afforded an opportunity to report a score. Such opportunity can always be provide or can be conditionally provided (e.g., provided when a given user had not reported a score within a recent absolute or functional time period (e.g., since a last detected event) or provided when neither or no user had reported a score within a recent absolute or functional time period). Automated processing of the input can ensure that the score is appropriately updated. Coordinated scorekeeping can also ensure that players 105*a* and 105*b* are presented with a consistent score.

In the depicted instance, devices 115*a* and 115*b* are worn by, attached, adhered, or held on each of the opponent's bodies. It will be appreciated that, alternatively or additionally, multiple team members can use mobile devices and an app to pair together and engage in coordinated scorekeeping.

In order to synchronize score presentations, it must first be determined on which devices a same score can be presented and/or point-reporting input can be received. This determination can include determining which devices to pair (e.g., via a Bluetooth or BT-LE connection). It will be appreciated that other communication channels can be used instead of or in addition to direct pairing, and reference herein to "pairing" can (in some embodiments) include participating in such an alternative channel. As one example, each device can pair with a local server. As another example, devices can communicate over a WiFi network.

A determination as to which devices to pair can be based on input received at a device from a user, such as a selection or identification of another user or device. As one example, a first user can input an identifier of a second user (e.g., a telephone number, email address or name), and a second device associated with the identifier can be identified. As another example, one or more devices can be identified based on an account associated with the device (e.g., when a user is logged into the account on the device or account data identifies the device). A user can then search for a particular "account" (thereby searching for a device) or an account connected to another user or scheduled game can be identified. The devices can then (or after a second user of the second device accepts a score-sharing invitation) be paired for scorekeeping purposes, such that each device can accept point-awarding inputs for influence of a same score and/or display the score.

As another example, a first device can present a list of other devices from which the user can select a second device from amongst the listed devices. The first device can then (or after a second user of the second device accepts a score-sharing invitation) be paired with the second device. The list can be associated with devices that are geographically close to the first device. In one instance, each device of a set of devices (e.g., devices that are executing an app) can determine its location based on GPS signals received at a GPS receiver in the device. The location can then be compared to a similarly determined location of the first device to determine which devices are close to the first device (e.g., less than a threshold distance away). In another instance, the list can include all devices that can communicate with the first device over a short-range connection (e.g., a Bluetooth or BT-LE connection). In yet another instance, the first device can be paired to a local server, and the list can include all other devices connected to the same server.

The list can be filtered to exclude a subset of the nearby devices, such as those already paired to another device, those engaged in another scorekeeping process, or those not in a contacts or friends list of the first user. The list can include, for each listed device, an identifier of a user (e.g., a name) associated with the device. The list can include, for each listed device, an indication as to a skill of an associated user (e.g., a ranking, which can be descriptive or which can include a score or rating).

Figure 2A:
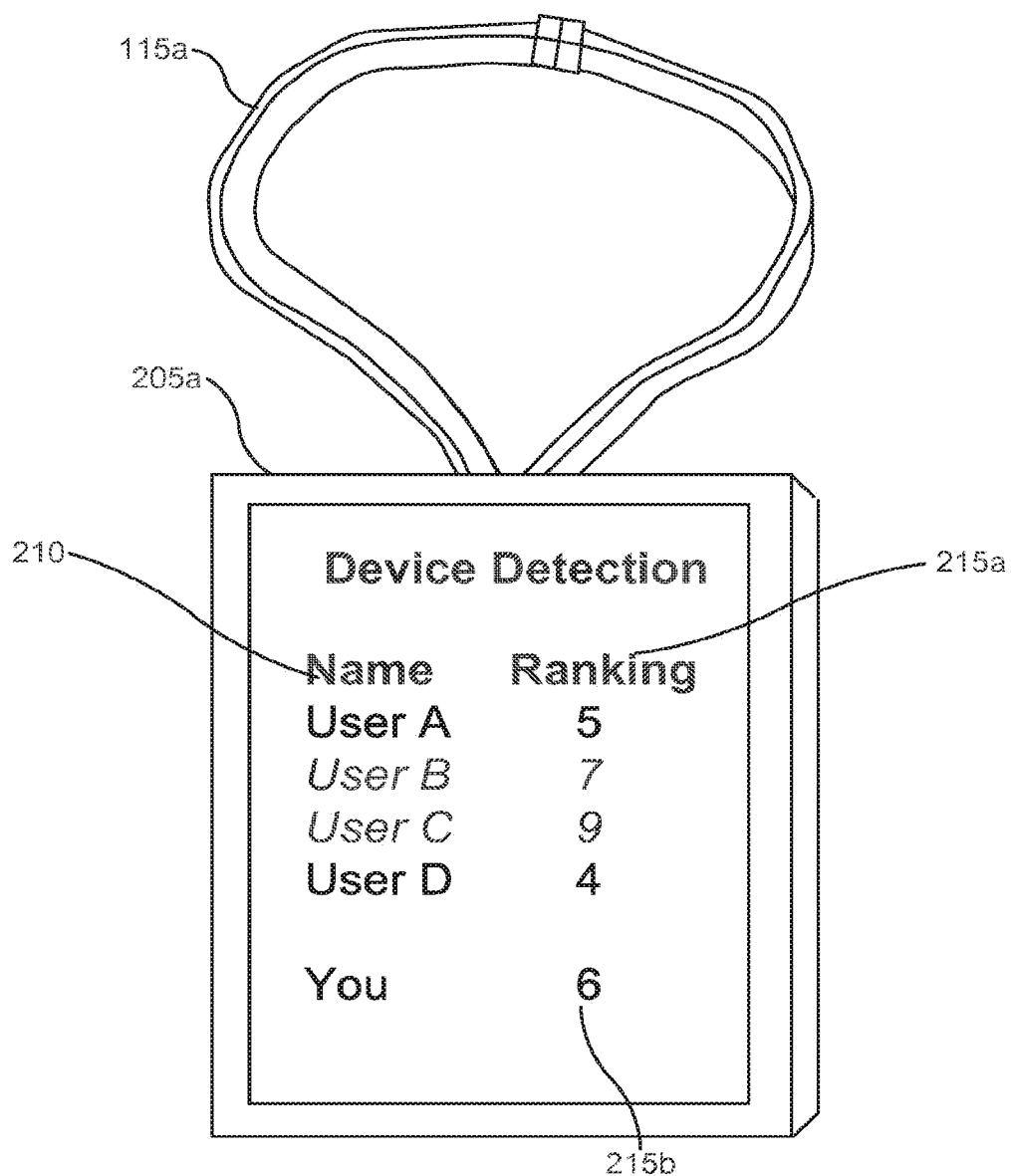
FIG. 2A shows an example of a screen displayed on a wearable device to assist in device pairing.

FIG. 2A shows an example of a screen 205*a* presented on a display of a mobile device 115*a* to aid device pairing. In the depicted illustration, a list of names can be presented on screen 205*a*. The names can include names associated with devices that are in communication with device 115*a* over a short-range network. Each name can be associated with a ranking 215*a*. In the depicted instance, the ranking is numeric. Higher values can indicate that the user is relatively skilled at a given sport. Screen 205*a* can also present a reference rank 215*b*, which can be indicative of a skill of a user of device 115*a*.

In some instances, familiarity information can further be conveyed. For example, a defined group, contact lists, email history, game history, or social-media friends lists can be used to determine which of the users associated with a device represented in a list is familiar to a user of device 115*a* Listed elements associated with these familiar users can be emphasized (e.g., using distinctive font styles or sizes or listing them high on the list). In the depicted illustrations, the italicization of Users B and C can indicate that these users and a user of device 115*a* are members of a same scorekeeping-app group. Screen 205 can include a touchscreen, such that a user can touch a listing to initiate sending of a pairing request to (or automatic pairing with) a device represented by the listing.

Figure 2B:
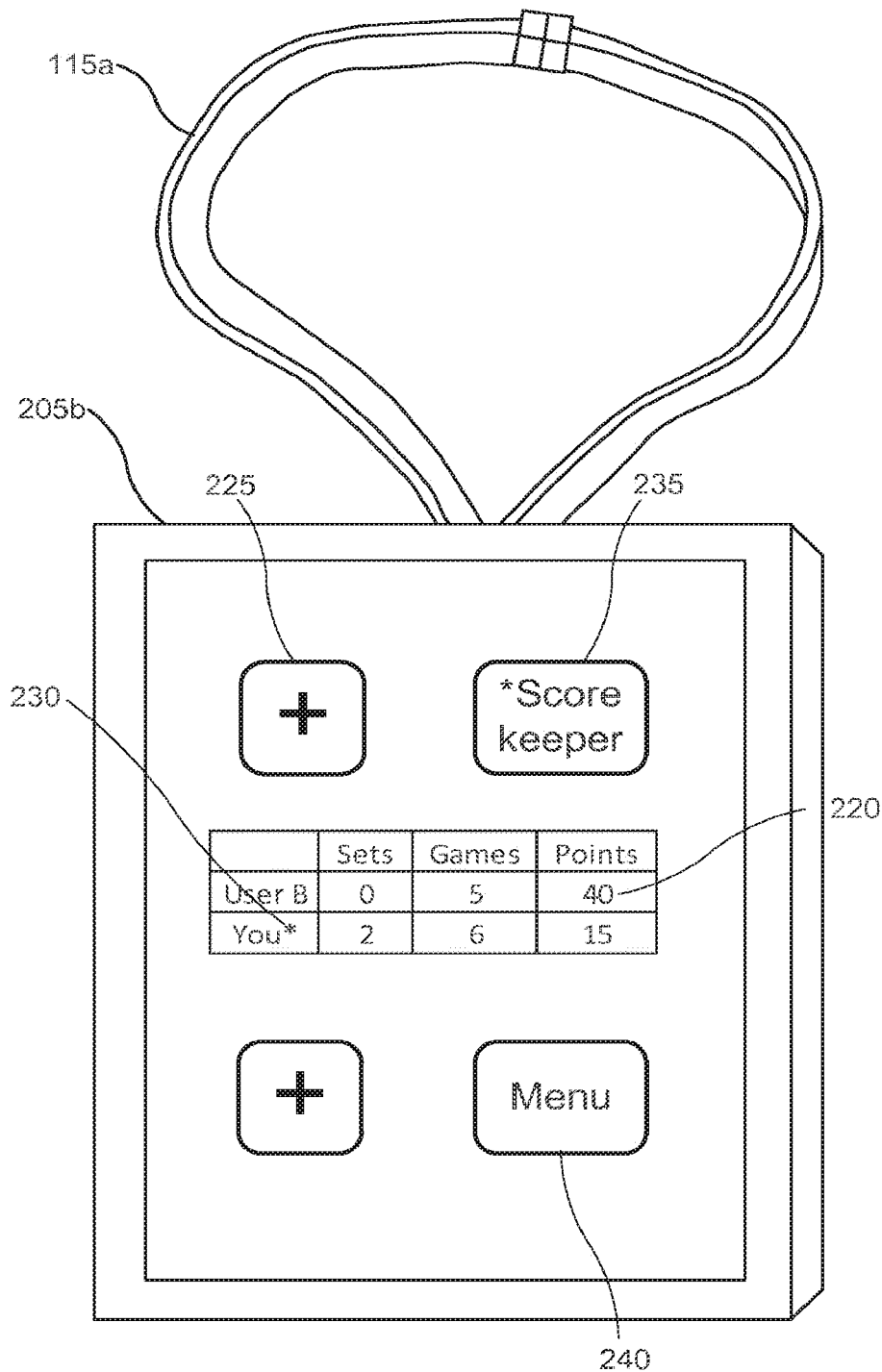
FIGS. 2B-2C show examples of screens displayed on a wearable device to convey a score and receive point-adjusting input.

Once paired, a score can be presented on each of the paired devices. Due to the pairing, the scores can be synchronized such that the scores visible on each of the paired devices are the same. FIG. 2B shows an example of a screen 205*b* on a display of device 115*a* for collecting and presenting information pertaining to a score. The screen can identify a current score 220. The current score can include one or more numbers. In the depleted illustration, a tennis score is presented, which includes an individual score for each player/team. In instances where more than one score is presented, an indication as the scores' correspondences can also be presented. In the depicted illustration, text is used to indicate that "15" is a score of a user of device 115*a* and "40" is a score of a user of the paired device. It will be appreciated that a location of a score on a screen can also or alternatively identify the correspondence.

Screen 205*b* can include one or more point-reporting options 225. In the depicted illustration, a user can touch the on the bottom to increment the user's score and the "+" on the top to increment the opponent's score. It will be appreciated that point-reporting options 225 can allow a user to input other types of information. For example, an option can allow a user to identify a magnitude of the point, a player credited with the point and/or an event (e.g., type of play, serve or pitch preceding the point). In some instances, screen 205*b* can be updated after receiving initial point-reporting input to allow a user to input additional pertinent details.

In some instances, a scorekeeper is designated. Screen 205*b* can include an identifier 230 indicating which user is a current scorekeeper. A scorekeeper can include one that is responsible for tracking the score. As one example, a scorekeeper can be the only user allowed to input point-reporting input. (Other users may, or may not, be provided with an opportunity protest a given point report.) As another example, multiple users can be allowed to input point-reporting input, though a scorekeeper can be required to review some or all reports and/or can override a given report. In one instance, only one user can be designated as a scorekeeper, while in other instances, multiple or all users can be a scorekeeper.

A scorekeeper can be designated based on user input (e.g., input that claims the designation or assigns it to another device). A scorekeeper can be designated by a rule and/or game status or progress (e.g., switching scorekeepers every quarter or designating a scorekeeper as a player on a receiving side of a serve).

Screen 205b can include a scorekeeper-changing option 235, which can allow a user to request or enact a change in a designation of a scorekeeper. For example, a user of device 115a can press scorekeeper-changing option 235 and surrender scorekeeping authority (e.g., to a particular user or generally).

Screen 205b can include additional input options and/or can present additional information. A user can navigate to the additional options and/or information by pressing a menu button 240. The options can include a score-correction option, which can allow a user to manually adjust a score; a pairing change (e.g., to indicate that a player in a game has changed or to add or delete a player). The information can include past score details (e.g., times and/or sequences of point awards) and/or information about a user of a paired device.

Figure 2C:
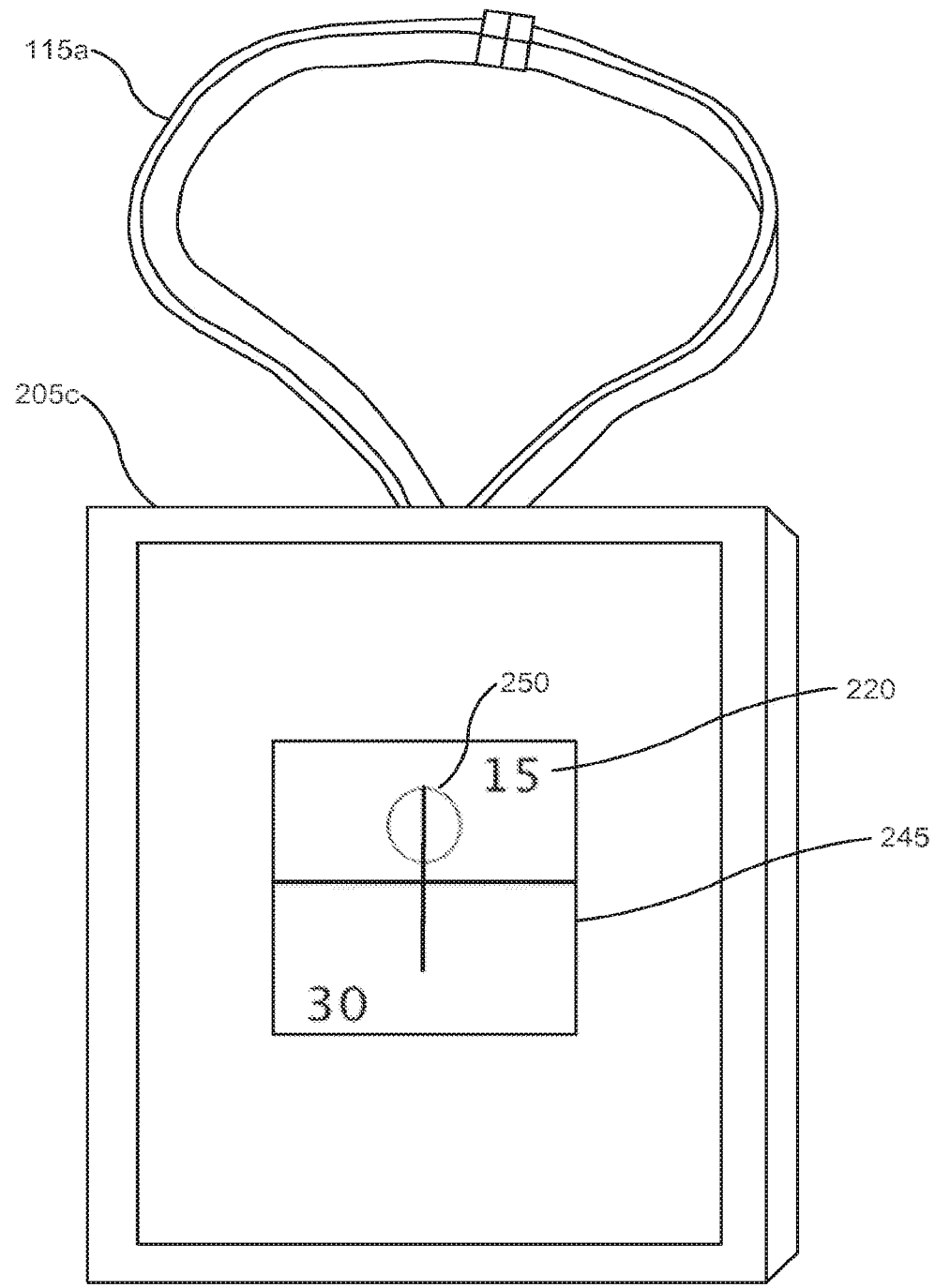

While FIG. 2B illustrates one interface for detecting point reports, other interfaces can be used. For example, FIG. 2C shows another example of a screen 205c on a display of device 115a for collecting and presenting information pertaining to a score. Screen 205c can include a representation of a game location 245 (e.g., a tennis-court representation). Screen 205c can identify a current score 220. In this illustration, a user's score is represented as a number on a bottom of the game-location representation ("30"), and an opponent's score is represented as a number on a top of the representation ("15"). A user can report a point by tapping a touch area 250 in the representation. A scoring player can be identified based on which portion of representation 245 includes touch area 250. For example, a touch area 250 below the horizontal line in the representation can identify that the user scored the point, and a touch area 250 above the horizontal line can identify that an opponent scored the point. Other input types or locations can convey other meaning (e.g., multiple taps could indicate ambiguity and/or that a point is to be ignored). A same or different tap can represent other information instead of or in addition to a point score. For example, a location of a tap can indicate which team or player is serving or where a ball touched the court for the most recent point (e.g., to record quadrant specificity or in-court accuracy).

Figure 3:
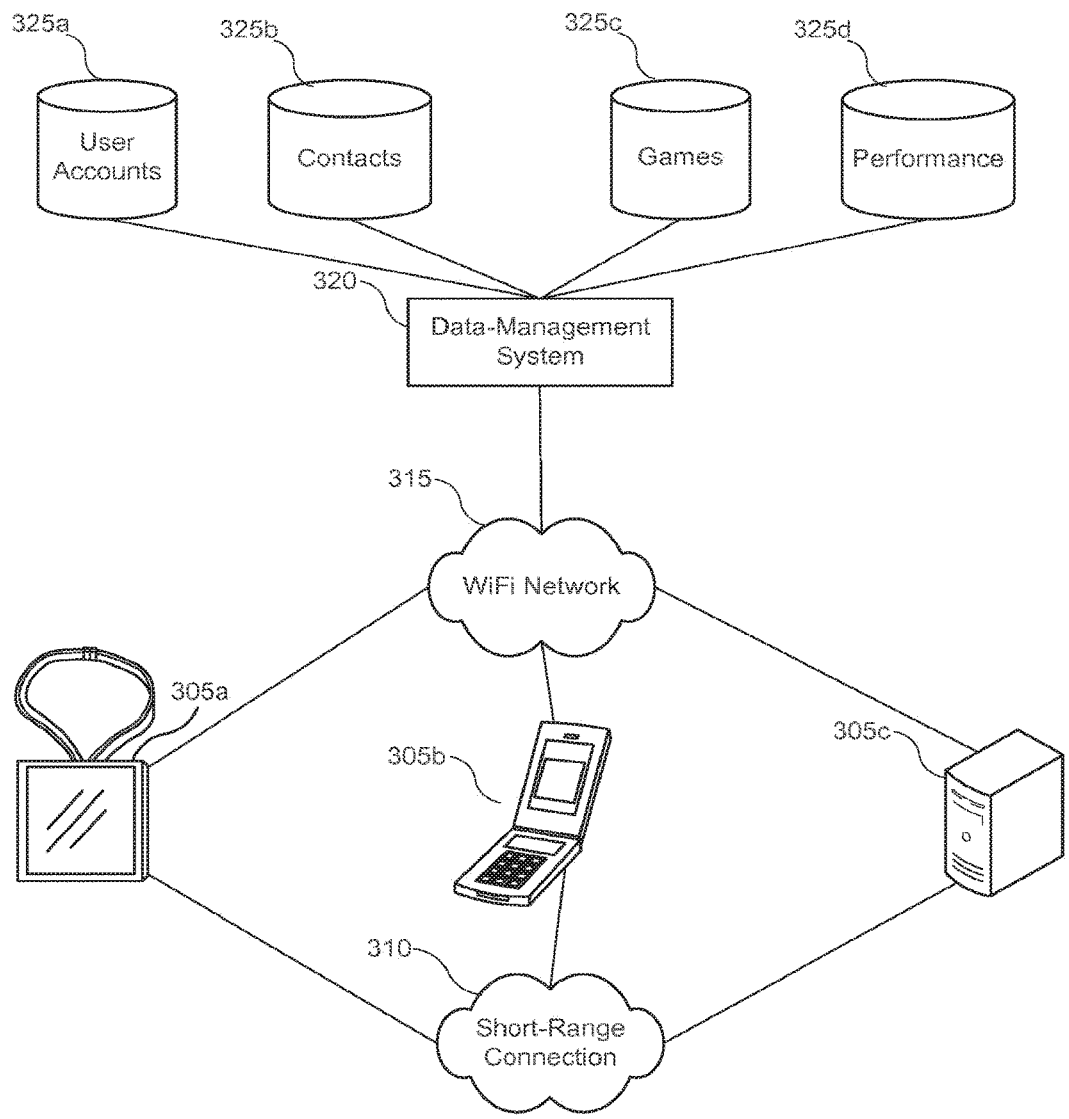
FIG. 3 shows examples of devices connected on a network to facilitate coordinated cross-device scorekeeping according to an embodiment of the present invention.

FIG. 3 shows examples of devices connected on a network to coordinate in scorekeeping efforts. Exemplary devices 305 that can participate in coordinated scorekeeping can include a wearable device 305a, a phone 305b (e.g., a smart phone) and a server 305c.

One or more devices 305 can be configured to receive input indicative of a scored point. One or more devices 305 can process the input to determine whether and/or how a score is to be adjusted. An adjusted score can be transmitted to other devices 305, such that a current score is known to each device 305.

In the depicted illustration, each device 305 is Bluetooth compatible and can communicate, via a short-range connection 310, such as a Bluetooth connection or BT-LE connection. When a particular device 305 connects with another device using a short-range connection, the devices can infer that they are near each other. This can aid in a user's decision as to whom to invite to a scorekeeping device pairing and/or to participate in a game.

Devices 305 can also or alternatively communicate over a WiFi network 315, such as the Internet. The WiFi network 315 can further enable one or more devices to access a remote data-management system 320.

Data-management system 320 can access data about particular users from a user-accounts data store 325a. For example, data-management system 320 can identify a name of a user associated with a particular device. A device 305 can then present this information to aid in a user's decision as to which device to invite to a pairing and/or game.

Data-management system 320 can also access various contact lists, which can be stored in a contacts data store 325b. Each contacts list can be associated with a particular user or device. A contact list can include a person's email contact list, phone contact list, or list of friends on a social-networking site. In some instances, the list identifies a set of users within a group defined in a context of a scorekeeping application. A device can use a contacts list to determine which users or devices to identify for potential pairing.

Data-management system 320 can access a games data store 325c, which can include details pertaining to previously completed games, current games and/or scheduled games. The games data can include a date and location of a game, identifications of users and/or devices involved in the game, a final or current score and/or a history of the score (e.g., when were points awarded and who was responsible for the points).

In some instances, data-management system 320 can analyze the games data to determine performance characteristics of a given user. For example, performance data can include a win-loss percentage, a number of games played, a number of points awarded and attributed to the user, and/or a historical trend of performance variables (e.g., a win-loss percentage in each month). Some or all of this information can be available to a user be assessed and/or to other users (e.g., those previously participating in a game with the assessed user or those considering pairing or scorekeeping with the assessed user).

It will be appreciated that, in some instances, one or more of data stores 325 can be stored locally on one or more devices 305 (e.g., a mobile device or a server).

Figure 4:
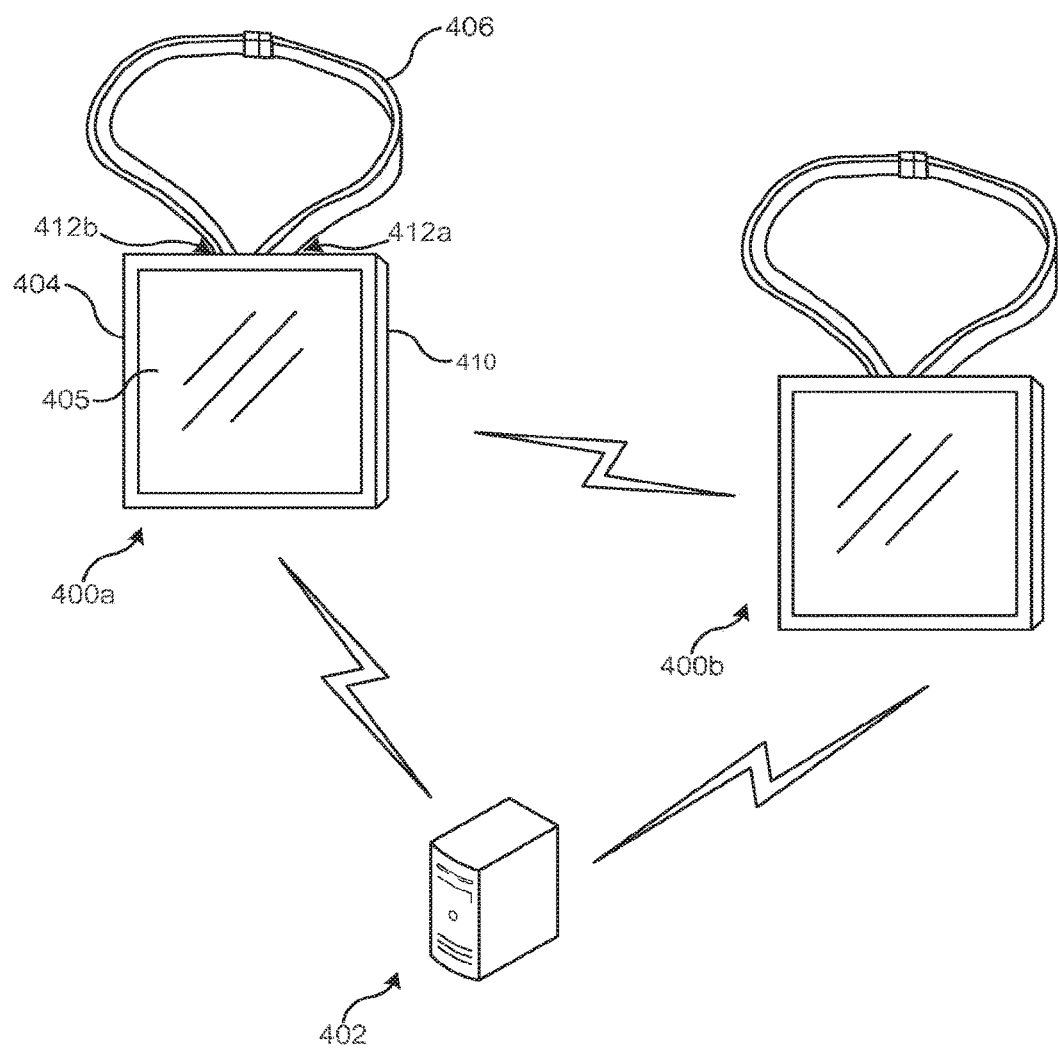
FIG. 4 shows multiple wearable devices communicating wirelessly with each other and with a server according to an embodiment of the present invention.

FIG. 4 shows two wearable devices 400a and 400b and a server 402 wirelessly communicating with each other. While wearable devices are included in the illustration, it will be appreciated that the illustrated devices can represent any two electronic devices capable of wirelessly communicating over a network. Further, while exemplary wearable devices (e.g., sports goggles or banded devices) are included in the illustration, it will be appreciated that the devices can include other types of wearable devices (e.g., wearable smart devices), such as glasses, head bands, arm bands, belts and/or watches. Server 402 can include any device facilitating scorekeeping and communicating with multiple user devices. Server 402 can be located near one or both wearable devices 400a and 400b (e.g., such that server 402 can detect each wearable device over a short-range network) of remotely from one or both wearable devices 400a and 400b.

Examples of a communication that can occur between any pair of the devices (e.g., between wearable devices 400a and 400b or between one wearable device and server 402) include: a broadcast searching for nearby devices, sending a communication with information pertaining to a point-reporting input, and/or receiving a communication indicative that a score is to updated (or can be updated if the update is conditioned). In this example, each wearable device 400 is shown as a banded device with a face portion 404 connected to a strap 406.

Face portion 404 can include, e.g., a touchscreen display 405. A user can view information presented by wearable device 400 on touchscreen display 405 and provide input to wearable device 400 by touching touchscreen display 405. For example, a user can use touchscreen display 405 to select a user or device to pair to (or request pairing), to initiate tracking of score, and/or to report or protest a point. In some embodiments, touchscreen display 405 can occupy most or all of the front surface of face portion 404.

Strap 406 can include sensors that allow wearable device 400 to determine whether it is being worn at any given time. Wearable device 400 can operate differently depending on whether it is currently being worn or not. For example, wearable device 400 can inactivate various user interface and/or RF interface components when it is not being worn. In addition, in some embodiments, wearable device 400a can notify wearable device 400b and/or server 402 when a user puts on or takes off wearable device 400a. Further, strap 406 can include sensors capable of detecting body-part articulations of a user wearing device 400; examples of such sensors are described below.

Server 402 can be any device that communicates with one or both wearable devices 400a and 400b. Server 402 can be mobile or non-mobile. In some instances, server 402 is associated with and/or positioned at a particular location. Examples of server devices can include a smart phone, tablet computer, other handheld computing and/or communication device, a laptop computer, a desktop computer systems, a security system, an environmental control systems, and so on.

Wearable devices 400a and 400b and server 402 can communicate wirelessly with each other over one or more networks. For example, device 400a can communicate with device 400b and/or server 402 using protocols such as Bluetooth or Wi-Fi.

In some embodiments, two or more of devices 400a, 400b and 402 can interoperate to enhance functionality available on one of the devices. For example, wearable device 400a and wearable device 400b can establish a pairing using a wireless communication technology such as Bluetooth. While the devices are paired, one of the devices can send notifications of selected events (e.g., point occurrence or score updates) to the other device, such that it can present corresponding information to the user. In some instances, one or more of devices 400a, 400b and 402 can communicate with another device. For example, any device can communicate with a data management system. As another example, a wearable, device 400a or 400b can be paired with a mobile device (e.g., a phone). This pairing can allow the wearable device to, e.g., inform a user of an incoming call or to answer a call.

Wearable device 400 can also provide an input interface via which a user can provide input. For example, the input can include one to initiate an action, such as an action to establish a pairing, send an invitation (e.g., for pairing with a device or playing a game), respond to a communication (e.g., to accept or decline an invitation, to confirm a point award or to protest a point award), to propose or effect a score change (e.g., to report that a point was scored, who scored the point, and/or a magnitude of the point) and/or to change a display (e.g., to view other information or action options). As another example, the input can include a response to an alert (e.g., to answer a phone call or reply to a text message).

It will be appreciated that wearable devices 400a and 400b and server 402 are illustrative and that variations and modifications are possible. For example, wearable devices 400a and 400b can be implemented in a variety of wearable articles, including glasses, a head band, an arm band, a belt, a watch, or the like. In some embodiments, wearable device 400 can be operative regardless of whether wearable device 400b and/or server 402 is in communication with wearable device 400a.

Figure 5:
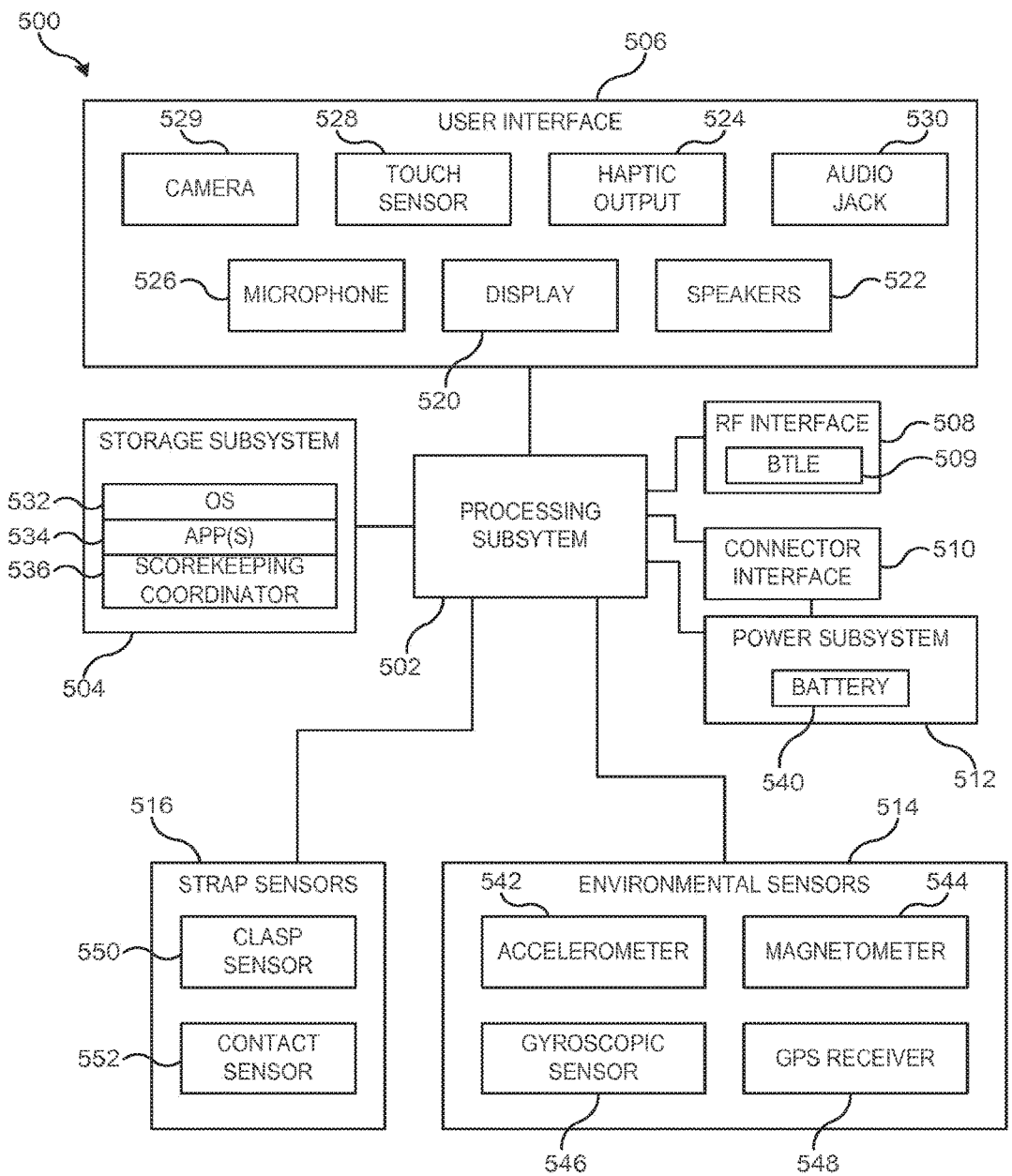
FIG. 5 is a simplified block diagram of a wearable device according to an embodiment of the present invention.

Wearable device 400 or 400b can be implemented using electronic components disposed within face portion 404 and/or strap 406. FIG. 5 is a simplified block diagram of a wearable device 500 (e.g., implementing wearable device 400a or 400b) according to an embodiment of the present invention. Wearable device 500 can include processing subsystem 502, storage subsystem 504, user interface 506, RF interface 508, connector interface 510, power subsystem 512, environmental sensors 514, and strap sensors 516. Wearable device 500 can also include other components (not explicitly shown).

Storage subsystem 504 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 504 can store media items such as audio files, video files, image or artwork files; information about a user's contacts (names, addresses, phone numbers, etc.); information about game-performance assessments and/or games that a user previously participated in; information about a user's scheduled games, appointments and events; notes; and/or other types of information, examples of which are described below. In some embodiments, storage subsystem 504 can also store one or more application programs (or apps) 534 to be executed by processing subsystem 502 (e.g., video game programs, personal information management programs, media playback programs, interface programs associated with particular host devices and/or host device functionalities, etc.).

User interface 506 can include any combination of input and output devices. A user can operate input devices of user interface 506 to invoke the functionality of wearable device 500 and can view, hear, and/or otherwise experience output from wearable device 500 via output devices of user interface 506.

Examples of output devices include display 520, speakers 522, and haptic output generator 524. Display 520 can be implemented using compact display technologies, e.g., LCD (liquid crystal display), LED (light-emitting diode), OLED (organic light-emitting diode), or the like. In some embodiments, display 520 can incorporate a flexible display element or curved-glass display element, allowing wearable device 500 to conform to a desired shape. One or more speakers 522 can be provided using small-form-factor speaker technologies, including any technology capable of converting electronic signals into audible sound waves. In some embodiments, speakers 522 can be used to produce tones (e.g., beeping or ringing) and can but need not be capable of reproducing sounds such as speech or music with any particular degree of fidelity. Haptic output generator 524 can be, e.g., a device that converts electronic signals into vibrations; in some embodiments, the vibrations can be strong enough to be felt by a user wearing wearable device 500 but not so strong as to produce distinct sounds.

Examples of input devices include microphone 526, touch sensor 528, and camera 529. Microphone 526 can include any device that converts sound waves into electronic signals. In spine embodiments, microphone 526 can be sufficiently sensitive to provide a representation of specific words spoken by a user; in other embodiments, microphone 526 can be usable to provide indications of general ambient sound levels without necessarily providing a high-quality electronic representation of specific sounds.

Touch sensor 528 can include, e.g., a capacitive sensor array with the ability to localize contacts to a particular point or region on the surface of the sensor and in some instances, the ability to distinguish multiple simultaneous contacts. In some embodiments, touch sensor 528 can be overlaid over display 520 to provide a touchscreen interface (e.g., touchscreen interface 403 of FIG. 4), and processing subsystem 504 can translate touch events (including taps and/or other gestures made with one or more contacts) into specific user inputs depending on what is currently displayed on display 520.

Camera 529 can include, e.g., a compact digital camera that includes an image sensor such as a CMOS sensor and optical components (e.g. lenses) arranged to focus au image onto the image sensor, along with control logic operable to use the imaging components to capture and store still and/or video images. Images can be stored, e.g., in storage subsystem 504 and/or transmitted by wearable device 500 to other devices for storage. Depending on implementation, the optical components can provide fixed focal distance or variable focal distance; in the latter case, autofocus can be provided. In some embodiments, camera 529 can be disposed along an edge of face member 404 of FIG. 4, e.g., the top edge, and oriented to allow a user to capture images of nearby objects in the environment such as a bar code or QR code. In other embodiments, camera 529 can be disposed on the front surface of face member 404, e.g., to capture images of the user. Zero, one, or more cameras can be provided, depending on implementation.

In some embodiments, user interface 506 can provide output to and/or receive input from an auxiliary device such as a headset. For example, audio jack 530 can connect via an audio cable (e.g., a standard 2.5-mm or 3.5-mm audio cable) to an auxiliary device. Audio jack 530 can include input and/or output paths. Accordingly, audio jack 530 can provide audio to the auxiliary device and/or receive audio from the auxiliary device. In some embodiments, a wireless connection interface can be used to communicate with an auxiliary device.

Processing subsystem 502 can be implemented as one or more integrated circuits, e.g., one or more single-core or multi-core microprocessors or microcontrollers, examples of which are known in the art. In operation, processing system 502 can control the operation of wearable device 500. In various embodiments, processing subsystem 504 can execute a variety of programs in response to program code and can maintain multiple concurrently executing programs or processes. At any given time, some or all of the program code to be executed can be resident in processing subsystem 504 and/or in storage media such as storage subsystem 504.

Through suitable programming, processing subsystem 502 can provide various functionality for wearable device 500. For example, in some embodiments, processing subsystem 502 can execute an operating system (OS) 532 and various applications 534 such as a phone-interface application, a text-message-interface application, a media interface application, a fitness application, and/or other applications. In some embodiments, some or all of these application programs can interact with a host device, e.g., by generating messages to be sent to the host device and/or by receiving and interpreting messages from the host device. In some embodiments, some or all of the application programs can operate locally to wearable device 500. For example, if wearable device 500 has a local media library stored in storage subsystem 504, a media interface application can provide a user interface to select and play locally stored media items.

Processing subsystem 502 can also execute a scorekeeping coordination code 536 (which can be part of OS 532 or separate as desired). In some embodiments, execution of scorekeeping coordination code 536 can cause wearable device 500 to search for and/or pair with another nearby wearable device and/or a server. Execution of scorekeeping coordination code 536 can cause a score of a game to be presented to a user and can further cause input to be received from the user indicating that the score is to be changed (e.g., that a point has been scored). Execution of scorekeeping coordination code 536 can cause assess whether the score is to actually change as proposed by the user (e.g., a decision of the assessment depending on a score-adjusting rule and/or input that from another paired device) and—if so—can adjust the score. Execution of the scorekeeping coordination code 536 can cause device 500 to generate and send communications to other devices that include information indicative of a proposed or actual score change (which can include a proposed or actual new score). Execution of scorekeeping coordination code 536 can further cause device 500 to receive and process incoming communications indicative of a proposed or actual score change, to update the score accordingly, and to display the updated code.

RF (radio frequency) interface 508 can allow wearable device 500 to communicate wirelessly with various host devices. RP interface 508 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. In some embodiments, RF interface 508 can implement a Bluetooth LE (Low energy) proximity sensor 509 that supports proximity detection through an estimation of signal strength and/or other protocols for determining proximity to another electronic device. In some embodiments, RF interface 508 can provide near-field communication ("NFC") capability, e.g., implementing the ISO/IEC 18092 standards or the like; NFC can support wireless data exchange between devices over a very short range (e.g., 20 centimeters or less). RF interface 508 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 508.

Connector interface 510 can allow wearable device 500 to communicate with various host devices via a wired communication path, e.g., using Universal Serial Bus (USB), universal asynchronous receiver/transmitter (UART), or other protocols for wired data communication. In some embodiments, connector interface 510 can provide a power port, allowing wearable device 500 to receive power, e.g., to charge an internal battery 540. For example, connector interface 510 cart include a connector such as a mini USB connector or a custom connector, as well as supporting circuitry.

In some embodiments, connector interface 510 and/or RF interface 508 can be used to support synchronization operations in which data is transferred from a host device to wearable device 500 (or vice versa). For example, a user can be able to customize settings and other information for wearable device 500. While user interface 506 can support data-entry operations, a user can find it more convenient to define customized information on a separate device (e.g., a tablet or smartphone) that has a larger interface (e.g., including a real or virtual alphanumeric keyboard), then transfer the customized information to wearable device 500 via a synchronization operation. Synchronization operations can also be used to load and/or update other types of data in storage subsystem 504, such as media items, application programs, personal data, and/or operating system programs. Synchronization operations can be performed in response to an explicit user request and/or automatically, e.g., when wireless device 500 resumes communication with a particular host device or in response to either device receiving an update to its copy of synchronized information.

Environmental sensors 514 can include various electronic, mechanical, electromechanical, optical, or other devices that provide information related to external conditions around wearable device 500. Sensors 514 in some embodiments can provide digital signals to processing subsystem 502, e.g., on a streaming basis or in response to polling by processing subsystem 502 as desired. Any type and combination of environmental sensors can be used; shown by way of example are accelerometer 542, a magnetometer 544, a gyroscope 546, and a GPS receiver 548.

Some environmental sensors can provide information about the location and/or motion of wearable device 500. For example, accelerometer 542 can sense acceleration (relative to freefall) along one or more axes, e.g., using piezoelectric or other components in conjunction with associated electronics to produce a signal. Magnetometer 544 can sense an ambient magnetic field (e.g., Earth's magnetic field) and generate a corresponding electrical signal, which can be interpreted as a compass direction. Gyroscopic sensor 546 can sense rotational motion in one or more directions, e.g., using one or more MEMS (micro-electro-mechanical systems) gyroscopes and related control and sensing circuitry. Global Positioning System (GPS) receiver 548 can determine location based on signals received from GPS satellites. In some instances, data detected from one or more environmental sensors can be used to identify a gesture indicative of particular input. For example, rather than using a touchscreen to indicate that a point was scored, this information can be conveyed by a particular arm movement. As another example, a wearable device can be used to automatically detect a serve, which can prompt the device to request that the serving user indicate a result of the score (e.g., whether a point is to be awarded or whether a fault occurred.

Other sensors can also be included in addition to or instead of these examples. For example, a sound sensor can incorporate microphone 526 together with associated circuitry and/or program code to determine, e.g., a decibel level of ambient sound. Temperature sensors, proximity sensors, ambient light sensors, or the like can also be included.

Strap sensors 516 (e.g., clasp sensor 550 and/or contact sensor 552) can include various electronic, mechanical, electromechanical, optical, or other devices that provide information as to whether wearable device 500 is currently being worn. In some embodiments, certain features of wearable device 500 can be selectively enabled or disabled depending on whether wearable device 500 is currently being worn.

Power subsystem 512 can provide power and power management capabilities for wearable device 500. For example, power subsystem 512 can include a battery 540 (e.g., a rechargeable battery) and associated circuitry to distribute power from battery 540 to other components of wearable device 500 that require electrical power. In some embodiments, power subsystem 512 can also include circuitry operable to charge battery 540, e.g., when connector interface 510 is connected to a power source. In some embodiments, power subsystem 512 can include a "wireless" charger, such as an inductive charger, to charge battery 540 without relying on connector interface 510. In some embodiments, power subsystem 512 can also include other power sources, such as a solar cell, in addition to or instead of battery 540.

In some embodiments, power subsystem 512 can control power distribution to components within wearable device 500 to manage power consumption efficiently. For example, power subsystem 512 can automatically place device 500 into a "hibernation" state when strap sensors 516 or other sensors indicate that device 500 is not being worn. The hibernation state can be designed to reduce power consumption: accordingly, user interface 506 (or components thereof), RF interface 508, connector interface 510, and/or environmental sensors 514 can be powered down (e.g., to a low-power state or turned off entirely), while strap sensors 516 are powered up (either continuously or at intervals) to detect when a user puts on wearable device 500. As another example, in some embodiments, while wearable device 500 is being worn, power subsystem 512 can turn display 520 and/or other components on or off depending on motion and/or orientation of wearable device 500 detected by environmental sensors 514.

Power subsystem 512 can also provide other power management capabilities, such as regulating power consumption of other components of wearable device 500 based on the source and amount of available power, monitoring stored power in battery 540, generating user alerts if the stored power drops below a minimum level, and so on.

In some embodiments, control functions of power subsystem 512 can be implemented using programmable or controllable circuits operating in response to control signals generated by processing subsystem 502 in response to program code executing thereon, or as a separate microprocessor or microcontroller.

It will be appreciated that wearable device 500 is illustrative and that variations and modifications are possible. For example, strap sensors 516 can be modified, and wearable device 500 can include a user-operable control (e.g., a button or switch) that the user can operate to provide input. Controls can also be provided, e.g., to turn on or off display 520, mute or unmute sounds from speakers 522, etc. Wearable device 500 can include any types and combination of sensors and in some instances can include multiple sensors of a given type.

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the wearable device has an RF interface, a connector interface can be omitted, and all communication between the wearable device and other devices can be conducted using wireless communication protocols. A wired power connection, e.g., for charging a battery of the wearable device, can be provided separately from any data connection.

Further, while the wearable device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 5 be implemented in a given embodiment of a wearable device.

In some instances, multiple wearable devices 500 can communicate and cooperate in scorekeeping. In such instances, the wearable devices need not necessarily include the same components. Thus, for example, a first wearable device can include a camera 529, while a second wearable device paired to the first does not.

Figure 6:
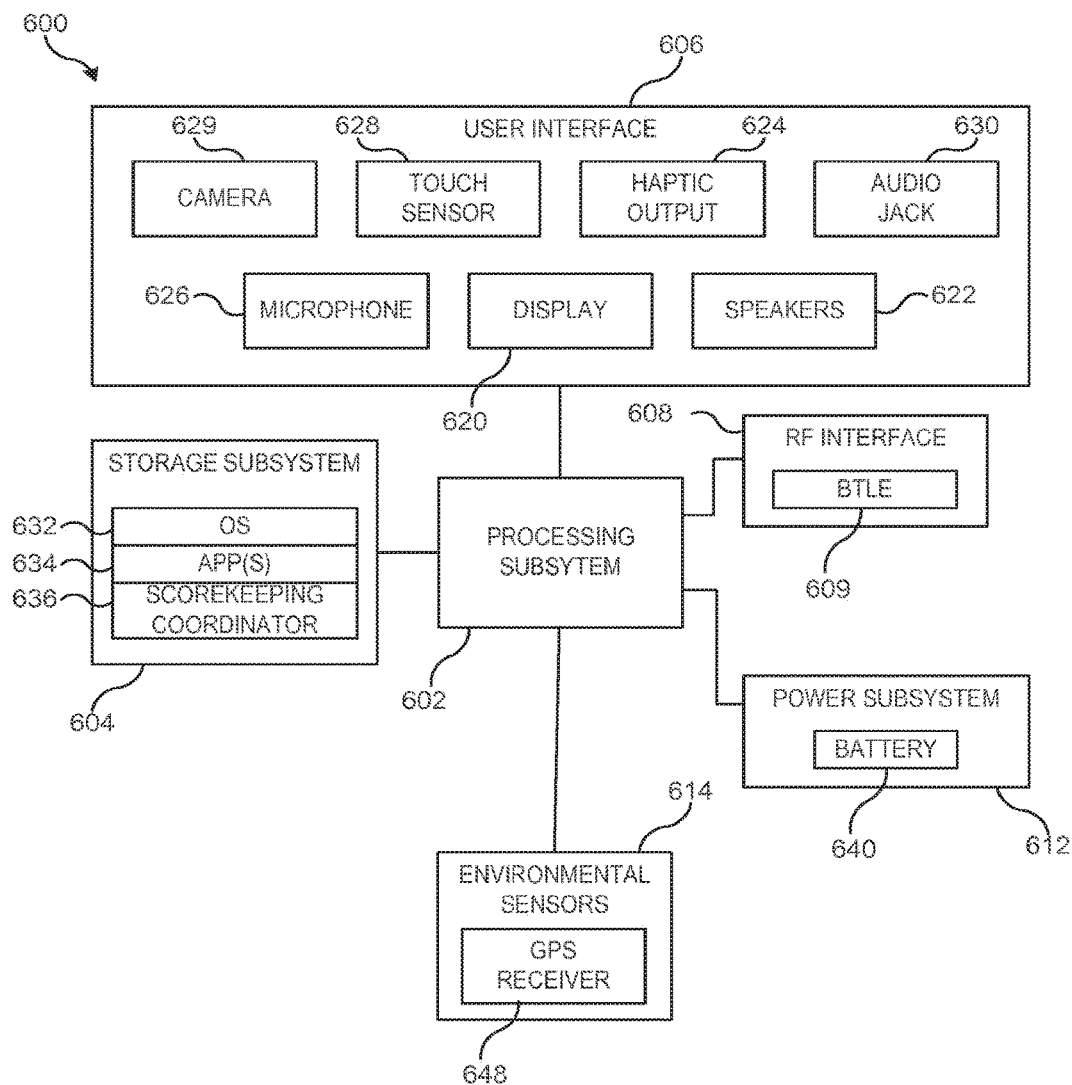
FIG. 6 is a simplified block diagram of a server according to an embodiment of the present invention.

A server such as server 402 of FIG. 4 can be implemented as an electronic device using blocks similar to those described above (e.g., processors, storage media, user interface devices, data communication interfaces, etc.) and/or other blocks or components. FIG. 6 is a simplified block diagram of a server 600 (e.g., implementing server 402 of FIG. 4) according to an embodiment of the present invention. Server 600 can include processing subsystem 602, storage subsystem 604, user interface 606, RP interface 608, power subsystem 612, and environmental sensors 614. Server 600 can also include other components (not explicitly shown). Many of the components of server 600 can be similar or identical to those of wearable device 500 of FIG. 5.

For instance, storage subsystem 604 can be generally similar to storage subsystem 504 and can include, e.g., using magnetic storage media, flash memory, other semiconductor memory (e.g., DRAM, SRAM), or any other non-transitory storage medium, or a combination of media, and can include volatile and/or non-volatile media. Like storage subsystem 504, storage subsystem 604 can be used to store data and/or program code to be executed by processing subsystem 602.

User interface 606 can include any combination of input and output devices. A user can operate input devices of user interface 606 to invoke the functionality of server 600 and can view, hear, and/or otherwise experience output from server 600 via output devices of user interface 606. Examples of output devices include display 620, speakers 622, and haptic output generator 624. Examples of input devices include microphone 626, touch sensor 628, and camera 629. These input and output devices can be similar to output devices described above with reference to FIG. 5.

Processing subsystem 602 can be implemented as one or more integrated circuits, e.g., one or more single-core or multi-core microprocessors or microcontrollers, examples of which are known in the art. In operation, processing system 602 can control the operation of server 600. In various embodiments, processing subsystem 602 can execute a variety of programs in response to program code and can maintain multiple concurrently executing programs or processes. At any given time, some or all of the program code to be executed can be resident in processing subsystem 602 and/or in storage media such as storage subsystem 604.

Through suitable programming, processing subsystem 602 can provide various functionality for server 600. For example, in some embodiments, processing subsystem 602 can execute an operating system (OS) 632 and various applications 634 such as a phone-interface application, a text-message-interface application, a media interface application, a fitness application, and/or other applications. In some embodiments, some or all of these application programs can interact with a wearable device, e.g., by generating messages to be sent to the wearable device and/or by receiving and interpreting messages from the wearable device. In some embodiments, some or all of the application programs can operate locally to server 600.

Processing subsystem 602 can also execute scorekeeping coordination code 636 (which can be part of OS 632 or separate as desired). In some embodiments, execution of scorekeeping coordination code 636 can cause server 600 to receive a communication indicative of a point-reporting input (e.g., from wearable device 400a of FIG. 4), determine whether to modify a score based on the input and/or generate and send a communication to another device (e.g., to wearable device 400b of FIG. 4) alerting the device of the modified score. Prior to modifying a score, scorekeeping coordination code 636 can, in some instances, cause server 600 to communicate with another device (e.g., to wearable device 400b of FIG. 4) to request any objection to or confirmation of a score modification. Score modification in accordance with the point-reporting input can be conditioned upon a lack of objection of affirmative confirmation. Scorekeeping coordination code 636 can further define how to respond to conflicting point reports. For example, communications from different devices can be inconsistent as to whether to award a point, who or which team a point is to be awarded to and/or a magnitude of a score. Scorekeeping coordination code 636 can evaluate the communications and/or other factors to determine how to respond to the conflict (e.g., to award no point, to adjust a game status, and/or to award a point of intermediate magnitude).

RF (radio frequency) interface 608 can allow server 600 to communicate wirelessly with various other devices and networks. RF interface 608 can include RF transceiver components such as an antenna and supporting circuitry to enable data communication over a wireless medium, e.g., using cellular voice and/or data networks, Wi-Fi (IEEE 802.11 family standards), Bluetooth® (a family of standards promulgated by Bluetooth SIG, Inc.), or other protocols for wireless data communication. In some embodiments, RF interface 608 can implement a Bluetooth LE (Low energy) proximity sensor 609 that supports proximity detection through an estimation of signal strength and/or other protocols for determining proximity to another electronic device. In some embodiments, RF interface 608 can provide near-field communication ("NFC") capability, e.g., implementing the ISO/IEC 18092 standards or the like; NFC can support wireless data exchange between devices over a very short range (e.g., 20 centimeters or less). RF interface 608 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 608.

Environmental sensors 614 can include various electronic, mechanical, electromechanical, optical, or other devices that provide information related to external conditions around server 600. Sensors 614 in some embodiments can provide digital signals to processing subsystem 602, e.g., on a streaming basis or in response to polling by processing subsystem 602 as desired. Any type and combination of environmental sensors can be used: shown by way of example is a GPS receiver 648. This sensor can operate similarly to the corresponding sensor in wearable device 500 described above. Other sensors can also be included in addition to or instead of these examples, such as temperature sensors, proximity sensors, ambient light sensors, ambient sound (or noise) sensors, or the like.

Power subsystem 612 can provide power and power management capabilities for server 600. For example, power subsystem 612 can include a battery 640 (e.g., a rechargeable battery) and associated circuitry to distribute power from battery 640 to other components of server 600 that require electrical power. In some embodiments, power subsystem 612 can also include circuitry operable to charge battery 640, e.g., when an electrical connector (not shown) is connected to a power source. In some embodiments, power subsystem 612 can include a "wireless" charger, such as an inductive charger, to charge battery 640 without relying on a physical connector. In some embodiments, power subsystem 612 can also include other power sources, such as a solar cell, in addition to or instead of battery 640.

In some embodiments, power subsystem 612 can control power distribution to components within server 600 to manage power consumption efficiently. For example, when server 600 is in an inactive state (not interacting with a user), power subsystem 612 can place device 600 into a low-power state, e.g., by powering off various components of user interface 606, RF interlace 608, and/or environmental sensors 614. Power subsystem 612 can also provide other power management capabilities, such as regulating power consumption of other components of server 600 based on the source and amount of available power, monitoring stored power in battery 640, generating user alerts if the stored power drops below a minimum level, and so on.

In some embodiments, control functions of power subsystem 612 can be implemented using programmable or controllable circuits operating in response to control signals generated by processing subsystem 602 in response to program code executing thereon, or as a separate microprocessor or microcontroller.

It will be appreciated that server 600 is illustrative and that variations and modifications are possible. In various embodiments, other controls or components can be provided in addition to or instead of those described above. Any device capable of interacting with, another device (e.g., mobile and/or wearable device) to facilitate pairing of proximate devices, to coordinate scorekeeping and/or to manage inter-device scorekeeping communications can be a server.

Further, while the server is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including-electronic devices implemented using any combination of circuitry and software. It is also not required that every block in FIG. 6 be implemented in a given embodiment of a mobile device.

Communication between one or more wearable devices, one or more mobile devices and a server can be implemented according to any communication protocol (or combination of protocols) that both devices are programmed or otherwise configured to use. In some instances, standard protocols such as Bluetooth protocols can be used. In some instances, a custom message format and syntax (including, e.g., a set of rules for inquiring particular bytes or sequences of bytes in a digital data transmission) can be defined, and messages can be transmitted using standard serial protocols such as a virtual serial port defined in certain Bluetooth standards. Embodiments of the invention are not limited to particular protocols, and those skilled in the art with access to the present teachings will recognize that numerous protocols can be used.

In accordance with certain embodiments of the present invention, devices can communicate such that each device can influence a tracked score of a game and such that a same score can be available for display on each device. In one instance, two mobile devices (e.g., one or both of which can include a wearable device) can directly communicate over. e.g., a short-range connection. In one instance, some or all of the communication is made by way of an intermediate device (e.g., a server).

In exemplary embodiments, point-reporting input can be received at a mobile device. Depending on implementation, one or more devices can act as a score-adjusting device that determines whether and/or how to adjust a score based on the input. For example, in one instance, a mobile device that received a point-reporting input can determine whether and/or how to adjust a score and can alert one or more other mobile devices and/or a server of the score change. In another instance, a mobile device can provide information pertaining to the point-reporting input (e.g., its occurrence, an identified player or team or a point magnitude) to a server. The server can then determine whether and/or how to modify a score and can alert devices of any score changes. In yet another instance, a second mobile device can be alerted that a first mobile device received point-reporting input. The second mobile device can then determine whether the reported score is to influence a score (e.g., by determining whether a user of the second mobile device objects to the point report after being notified of it). The second mobile device can send a communication back to the first device with the result of its determination.

Figure 7:
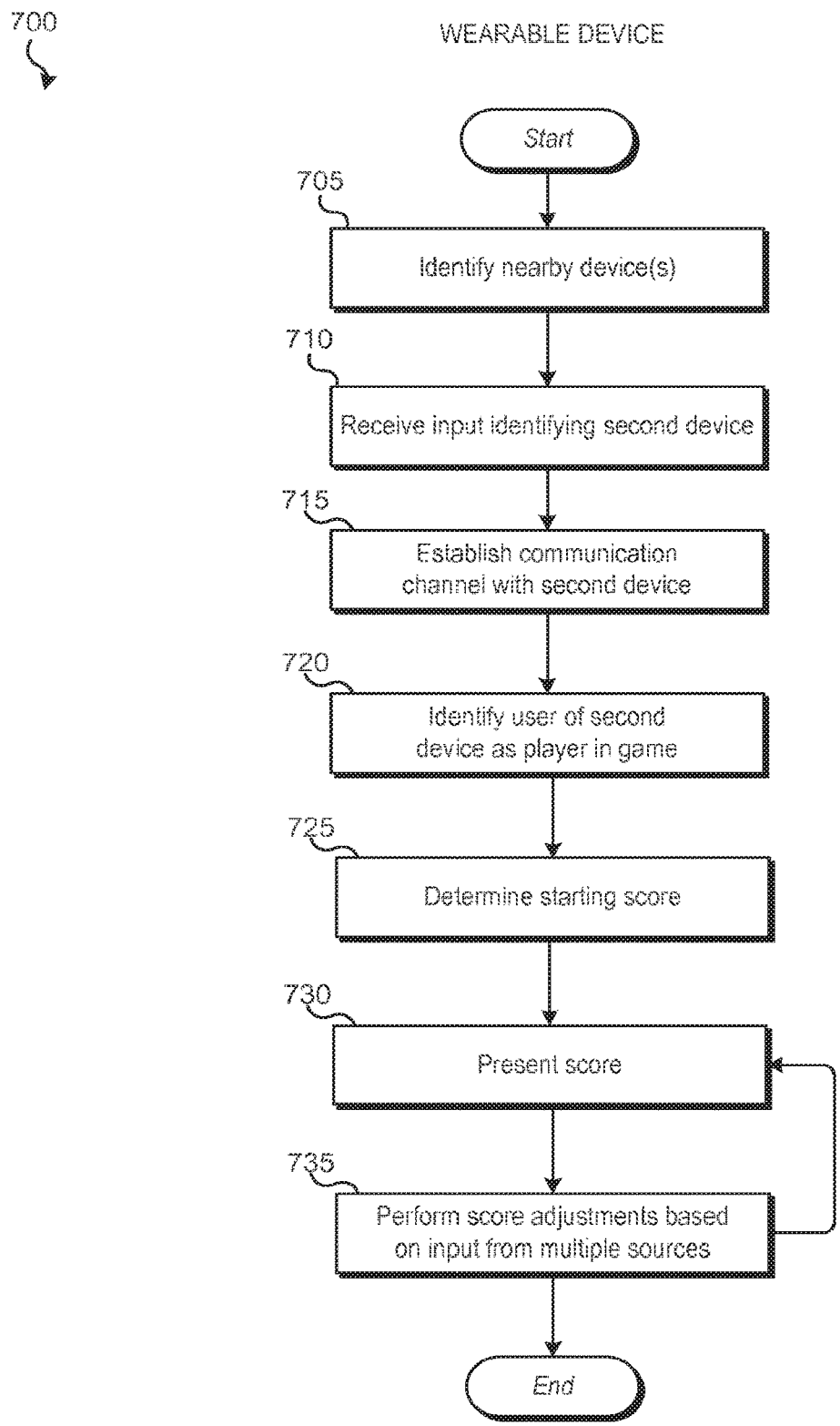
FIG. 7 is a flow diagram of a process for using a first wearable device of a first player to pair with a second device of a second player for coordinated and consistent scorekeeping.

FIG. 7 is a flow diagram of a process for pairing with a device for coordinated and consistent scorekeeping. Part or all of process 700 can be implemented in a first mobile (e.g., wearable) electronic device.

One or more nearby devices can be identified at block 705. The identified devices can include those near the first mobile device. The nearby devices can include those detected (e.g., generally or detected and associated with an above-threshold signal strength) by the first mobile device over a short-range network (e.g., a Bluetooth or BT-LE network). In some instances, the nearby devices can be identified based on a communication received from another device (e.g., a server). The other device can identify nearby devices via short-range-network detection (e.g., when the other device is also near the first device) or, by comparing other devices' locations (e.g., GPS coordinates) to a location of the first device.

The nearby devices can include mobile devices, those executing a scorekeeping app and/or those not currently engaged in a game or scorekeeping. In some instances, the identification is constrained to only identify nearby devices associated with a particular characteristic. For example, the identification can be constrained to only identify nearby devices that are also associated with a contact list stored on the first mobile device, associated with a user skill ranking within a given range, associated with a particular type of game (e.g., based on a game-type selection made by a user of the device using an app), and/or associated with a user of a particular demographic (e.g., gender or age bracket). The constraint can be pre-defined (e.g., as a default setting) or based on user input.

Some or all of the identified devices can be identified to a first user of the first mobile device (e.g., on a display of the first mobile device). For example, in one instance, each device identified at block 705 can be executing a scorekeeping app, and user's name associated with the identified device can be determined based on stored app data. A list of the users' names associated with the identified devices can then be presented. Additional information (e.g., a skill ranking, a game-type of interest and/or a demographic characteristic) can further be presented.

The first mobile device can allow a user to select a second device from amongst the identified devices. For example, a touchscreen can allow a user to touch a list item to select a particular device. Thus, at block 710, input can be received (e.g., from a first user of the first mobile device) that corresponds to an identification of a second device.

A communication channel can be established with the second device at block 715. In some instances, the input received at block 710 can cause a request (e.g., to play a game and/or to participate in scorekeeping) to be sent to the second device, and the communication channel can be established when a second user of the second device accepts the request. The communication channel can exist over a short-range network and/or over a wireless network. In one instance, establishing the communication channel includes pairing the devices. The communication channel can include a channel directly connecting the first and second devices or a channel connecting the two devices via one or more intermediate devices (e.g., a nearby or remote server).

At block 720, a second user of the second device can be identified (e.g., to the first user) as being a player, in a game. For example, an identifier of the second device (e.g., a name of the second device or a name of the second user) can be presented on a display of the first device. The identifier can be presented in a manner (e.g., at a location or with a font style) that indicates whether the second user is a competitor or a team mate. In one instance, a presentation indicates that the second device is associated with a player in the game but does not (at least initially) specifically identify the second user or second device. Such detail can be subsequently presented, for example, in response to a request from the first user for such information.

In one instance, a sporting area can be represented in a presentation. For example, a line drawing of a football field, tennis court, basketball court or running track can be displayed. A graphic (or text) can be positioned within the sporting-area representation at a point that indicates a location of the second user (e.g., as being on a side of a tennis court opposite to the first user, as being on a particular yard line or as being at a particular location on a track).

A starting score for the game can be determined at block 725. The starting score can include one or more point totals, each point total being associated with a player or team. Each point total can initially be set to zero. In some instances, a stored point total (e.g., from a previous game) can be retrieved and used in the starting score.

The starting score can be presented on a display of the first mobile device at block 730. When a score includes multiple point totals, each point total can be presented in a manner that indicates which player or team is associated with the point total. For example, the point total can be located near a representation of an associated player or team. In some instances, the presentation can include a selectable option that allows a user to enter input indicating that the score (e.g., a point total in the score) has changed.

At block 735, the score can be repeatedly adjusted based on various types of input. For example, one score adjustment can be performed in response to input received from a first user via an interface of a mobile device performing part or all of process 700. Another score adjustment can be performed based on a communication received from another device (e.g., the identified second device or a server in communication with the second device) that includes a score update or point report. The communication can be received over the established communication channel. Thus, each of multiple users can be allowed to cause a single score to be adjusted. Process 700 can then return to block 730 to present the adjusted score. Process 700 can then continue to iteratively adjust the score and present the adjusted score until, e.g., a game is completed or terminated, at which point process 700 can conclude.

It will be appreciated that process 700 can be modified to receive input identifying multiple second devices at block 710 and establish a communication channel with each second device at block 715. For example, for a doubles tennis match, a user can identify three other players (e.g., each associated with a nearby second device), and communication channels can be established with each second device. As another example, for a basketball game, a user can identify the user's team and an opponent team. A communication channel can then be established between the first device and a device associated with each team member and with each player on the opposing team.

It will further be appreciated that a variety of events can precede the establishment of the communication channel at block 715. For example, a first user can search for a second user (e.g., by identifying a name, email address, phone number of team name of the second user). A short-range or comprehensive search can be performed to identify and/or locate the second user. In some instances, the first user can be invited to confirm the search result and/or to send a game or scorekeeping invitation to the second user. As another example, a game can be scheduled in advance such that the players are known. Communication channels can then be established, for example, when a second device of a player of the game nears the first device or when both of the devices are near (or otherwise communicating with) a central device.

As noted in block 735 of process 700, score adjustments can be made in response to inputs from different sources. This ability can allow each player to be involved in scorekeeping, can reduce the possibility that a point is not recorded and can facilitate consistent scorekeeping. However, circumstances can arise where users differ in their opinions pertaining to a particular potential or actual point. Thus, some input may need to be at least partly ignored or overridden to respond to inconsistent point reports.

Figure 8:
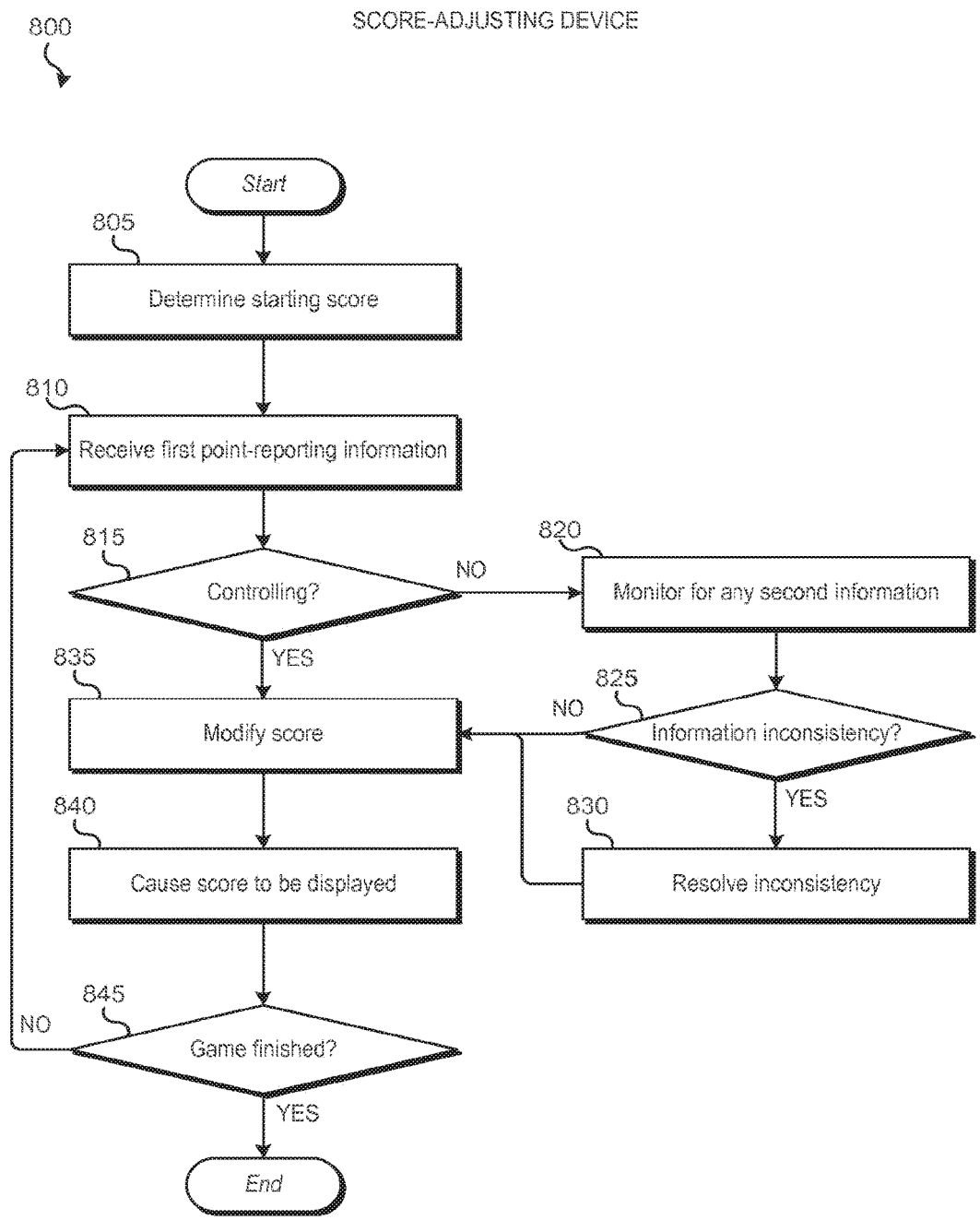
FIG. 8 is a flow diagram of a process for determining whether to adjust a score based on a point-reporting input according to an embodiment of the present invention.

FIG. 8 is a flow diagram of a process for determining whether to adjust a score based on a point-reporting input according to an embodiment of the present invention. Part or all of process 800 can be implemented in a score-adjusting device. The score-adjusting device can include a mobile (e.g., wearable) electronic device or a server. It will be appreciated that, in some instances, a designation of a score-keeping device can be dynamic. For example, a score-keeping device can be designated as any device receiving point-reporting input. As another example, a score-keeping designation can change automatically (e.g., at intervals in the game after point scores) or responsive to designation-defining inputs.

A starting score can be determined at block 805. The starting score can include one or more point totals, each point total being associated with a player or team. Each point total can initially be set to zero. In some instances, a stored point total (e.g., from a previous game) can be retrieved and used in the starting score.

At block 810, first point-reporting information can be received. In one instance, the information can be received from a user via an interface provided by the score-adjusting device. In one instance, the information is presented in a communication received from another device (e.g., a mobile device or a server). The received communication can be indicative that a user of another device reported a point scoring. Thus, the first point-reporting information can be associated with a user who provided first point-reporting input. The association can be determined based on a source of the first point-reporting information and/or a user or device identification included in the information.

The first point-reporting information can be indicative that a point was scored. The first point-reporting information can further include details such as: a player and/or team having scored the point, a magnitude of the point (e.g., 3-point shot versus free-throw or 2-point shot), a time of the point, and/or a type of play preceding the point (e.g., a type of serve or pitch, a type of defense or a play call).

At block 815, a determination can be made as to whether the received first point-reporting information is controlling. The determination can be made using a rule or hierarchy and can depend on an identity of a user associated with the information, an identity of one or more other users (e.g., playing in a game associated with the user), a characteristic of a user associated with the information (e.g., a skill ranking, or an absolute or relative number of involvements in past inconsistent point-reporting), a characteristic of one or more other users and/or a status of a game (e.g., whether the user is a serving or receiving player, whether the user playing offense or defense, or a current quarter).

For example, a reliability metric can be determined for each user participating in a shared scorekeeping effort. The metric can depend on a number of past scorekeeping participations, a number of past game participations, a win-loss percentage, and/or a number of times in which the user entered information inconsistent with information entered by another user. Using such metrics, a hierarchy can be established amongst the users, such that (for example) a report from a user with a highest reliability metric is difficult or impossible to effectively refute.

In some instances, a scorekeeper user can be designated. The scorekeeper designation can be fixed throughout a game or can be moved across users (e.g., at particular time periods and/or in response to a request to take over or surrender the designation).

When the received information is determined not to be controlling, process 800 can continue to block 820 to monitor for any additional information. In one instance, the score-adjusting device or another device (e.g., an interface device having received input corresponding to the first point-reporting information) can transmit a notification to some or all mobile devices to alert respective users that a point had been reported, who reported the point and/or details of the point report (e.g., a reported point magnitude or credited player and/or team). The notification can (in some instances) present an option to confirm or protest the point report. For a point-report protest, a user can identify a reason for the protest (e.g., asserting that no point score occurred, that the wrong party was identified for credit of the point, or that the point was of an inaccurate magnitude). In some embodiments (e.g., where a designation of the score-adjusting device is dependent on which device received, point-reporting information), this response can be characterized as report-responsive information so as to not cause another device to simultaneously designate itself as a score-adjusting device. Alternatively, a user can enter an independent point-reporting input with details that can differ from those in the notification to identify the protest.

The score-adjusting device can then monitor to determine whether any other user has entered input corresponding to a same potential point. For example, the score-adjusting device can monitor for input received via a local interface (e.g., when the first point-reporting information is received from another device), and/or it can monitor for communications from a mobile device or server.

A determination can be made as to whether the first point-reporting information is inconsistent with any second information (or lack thereof) at block 825. An inconsistency can be identified when second information corresponding to the first point-reporting information is received and at least partly differs in its details. For example, the second information can indicate that no point was scored, or the first and second information can differ in an account as to which player or team scored a point, a magnitude of a point or a type of play preceding the point. In some instances, the second information only includes a disputed element of the first point-reporting information remaining elements can be assumed to be undisputed.

If particular details are absent in either the first or second information (e.g., the second information not identifying a magnitude of a point), it can still be concluded that the first information is consistent with the second information. In some instances, monitoring can occur for a fixed lime period. If no additional information is received during the time period, it can be determined that there is no information inconsistency.

When an information consistency is identified, process 800 can continue to block 830 where the inconsistency can be resolved. The inconsistency can be automatically resolved using a rule or hierarchy. For example, a hierarchy or reliability metric can be used to determine which of the first point-reporting information and second point-reporting to use in response to an inconsistency. The resolution can depend on an identity of one or both users providing the first and second information, a characteristic of one or both users, a status of the game and/or when the first and/or second information was received.

In one instance, a resolution is determined to align with details in either the first or second information. In another instance, an intermediate resolution is determined. For example, in a disagreement about who scored a point in tennis, the point can be ignored and not credited to either side. As another example, in a disagreement about whether a point was scored or a point's magnitude, a partial point magnitude can be awarded (e.g., awarding a single point as a result of a dispute as to whether a two-point shot was made).

In some instances, a message can be sent to one or both users associated with the first and second information, requesting that the users resolve the inconsistency and report the resolution to a device using an interface of the device. The message can identify the users corresponding to the first and second information and can identify the inconsistency.

When any inconsistency is resolved, when no inconsistency was determined to have existed or when the received point-reporting information was determined to be controlling, process 800 can move to block 835 where a current score can be modified. The score can be modified to credit reported one or more points (e.g., of a default or specified magnitude) to an identified player or team. In some instances, information about the point (e.g., a time, a scoring individual, a credited player or team, a preceding type of play) can be stored in association with the game.

At block 840, the score-adjusting device can cause the modified score to be displayed on a display of one or more mobile devices. In instances where the store-adjusting device includes a user device, the score can be presented on a display of the score-adjusting device. The score can also or alternatively be transmitted to one, more or each (e.g., other) mobile device such that it can be presented on a display of the receiving device. It will be appreciated that the score can also or alternatively be presented audibly (via speakers on the score-adjusting device or another device).

At block 845, a determination can be made as to whether a game has concluded. This determination can be based on user input, an absolute time, a game time (e.g., tracked by a timer on a mobile, central or remote device), or a current score. When it is not determined that a game has concluded, process 800 can return to block 810 to wait for subsequent point-reporting information. Repetition of blocks 810-840 can cause the score to be repeatedly modified and displayed. When it is determined that a game has finished, process 800 can end.

While FIG. 8 refers to processing point-reporting information, it will be appreciated that other types of reporting information can be (alternatively or additionally) received and processed. For example, the information can report a penalty (e.g., identifying a type of penalty, penalty-committing player or team, penalty victim, and/or consequence), a play occurrence (e.g., indicating that a play occurred, identifying team members involved in play and/or a play call), identifying a game status (e.g., identifying a location of one or more players) and/or play result (e.g., identifying a completion time for a particular player for a swimming or running event, indicating whether yards were gained in football or a base runner advanced in baseball). Thus, process 800 can be used to consistently track status of a game. Process 800 can even be used to monitor individual sports, such as swimming or track events.

Certain embodiments described herein can be particularly useful for facilitating consistency and communication between devices of multiple players. In some embodiments, only devices associated with players of the game can influence the score, and/or this score-adjusting device is not connected with mobile devices of any user who is not a player in a given game. However, in some embodiments, devices can also receive, assess and use input from non-player users (e.g., spectators or referees) to determine game variables (e.g., score). In some embodiments, a game variable is influenced by at least one device input received from a player. In some embodiments, a communication channel exists between score-adjusting device and at least one player device.

Figure 9:
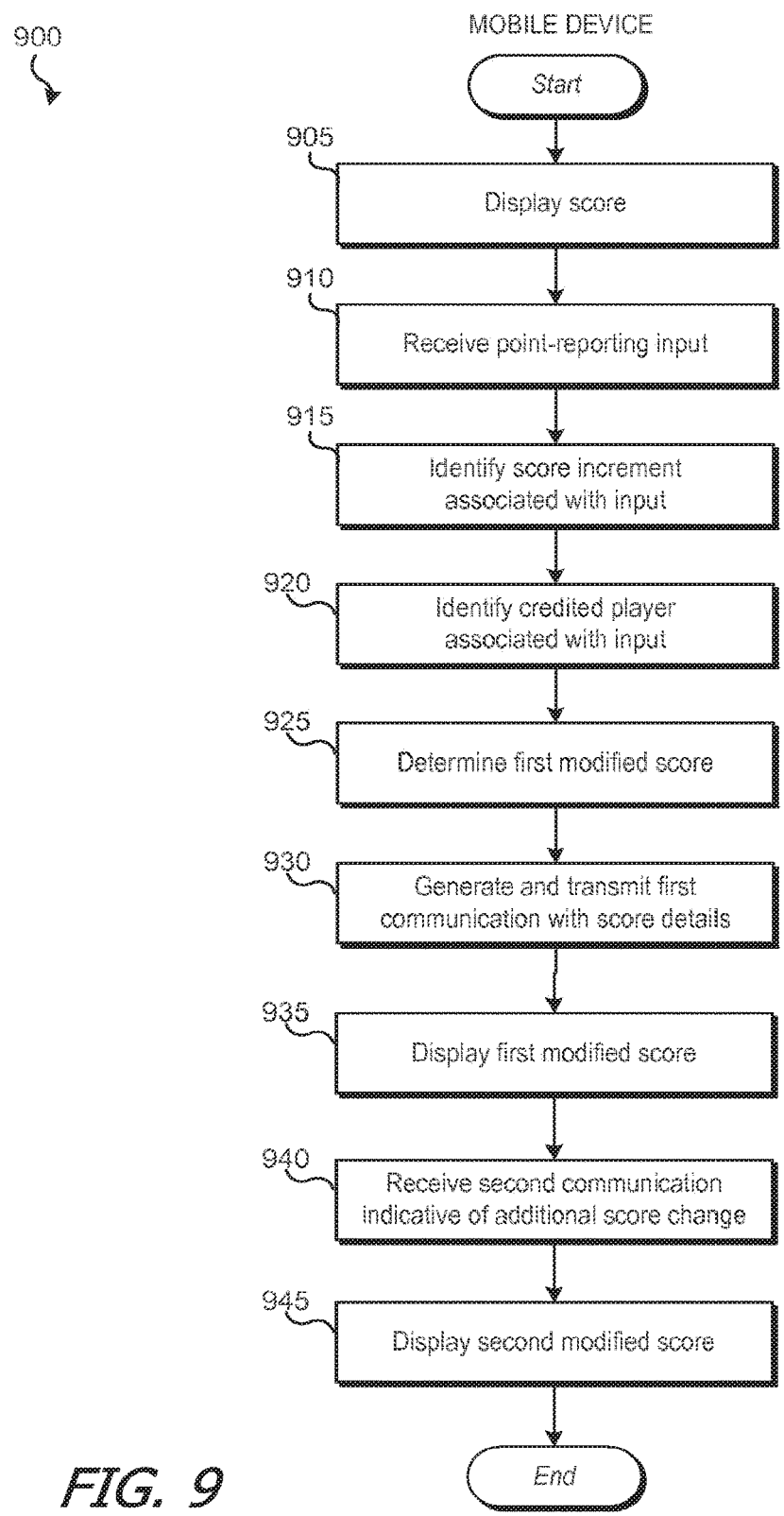
FIG. 9 is a flow diagram of a process for receiving and responding to input indicative of a new point and displaying a current score according to an embodiment of the present invention.

FIG. 9 is a flow diagram of a process for receiving and responding to input indicative of a new point and displaying a current score according to an embodiment of the present invention. Part or all of process 900 can be implemented in a mobile (e.g., wearable) electronic device.

At block 905, a current score can be displayed. The score can be include, e.g., one or more point totals and/or numbers (e.g., a number associated with each of one or more players or teams participating in the game). Each point total and/or number can be presented so as to correspond to an identified player or team. Other information (e.g., a game status, a remaining or elapsed game time, and/or an identification of players or teams participating in the game) can simultaneously be presented or be presented upon detecting a request for the information.

At block 910, a point-reporting input can be received via a user interface of the point-reporting input device from a user. For example, a user can touch one or more portions of a touchscreen display, can use one or more gestures, can speak one or more voice command or can press one or more buttons to report a point. The report can indicate that a point was scored, a player or team that scored the point and/or a magnitude of the point.

A score increment to associate with the input can be identified at block 915. In one instance, the increment is defined and fixed. For example, each point can correspond to a magnitude of "1". In one instance, the increment is defined though not fixed. For example, in tennis, a point increment can be 15 points if a current score is 0 or 15 and 10 points if a current score is 30. In one instance, the increment is determined based on user input. For example, in basketball it can be difficult or impossible to determine whether a given point corresponds to an increment of 1, 2 or 3. User input can be relied upon to distinguish these possibilities. However, a default increment (e.g., "2") can be set to handle situations where a user docs not enter the increment.

A player to credit for the point can be identified at block 920. The determination can be based on information within the point-reporting input or based on which device received the input. For example, a rule can indicate that point-reporting information is only supposed to be entered into mobile devices of the scoring player.

A first modified score can be determined based on the input at block 925. For example, a point in a current score can be incremented by an amount identified at block 915. In some instances, this first modified score can be a conditional score, such that any inconsistent information subsequently received from another device can be evaluated to determine whether a different score is to be used. This evaluation can be performed at the mobile device or another device. The score determined at block 925 can be different from the score displayed at 905, due to the occurrence of the reported point.

At block 930, a first communication that includes score details can be generated and transmitted to one or more devices (e.g., a mobile device, a device of a player, a nearby or remote server). In one instance, the communication is sent to multiple devices (e.g., a mobile device associated with each of one or more players in the game). The communication can allow other devices to be informed of a current score and/or provide an opportunity for other users to object to the report (e.g., by identifying contrary information). The communication can include the determined first modified score, information included in the received input or variables identified based on the input.

A first modified score can be displayed on a display of the mobile device at block 935. The display can be conditioned upon a lack of receipt of inconsistent information and/or a lack of any resolution inconsistent with the first modified score. In some instances, during a period in which it is uncertain whether contrary information may be provided, the first modified score can be displayed in a manner indicating that the score is conditional.

At block 935, a second communication can be received (e.g., from another mobile device or a server) that is indicative of an additional score change. For example, the second communication can be indicative that a second user reported a point to a second mobile device. This additional score change can (in some instances) be determined not to refute the point reported in the input received at block 910 but instead to correspond to a different point occurrence. This determination can be made based on a time that the second communication was received (e.g., after a threshold amount of time after the first communication was transmitted) or based on content of the communication. The second communication can include a score and/or point details (e.g., who was reported to have scored a point and/or a magnitude of the point).

A second modified score can be displayed on a display of the mobile device at block 945. In some instances, a notification is displayed (e.g., subsequent or prior to the display of the second modified score) that a point was reported (e.g., including details of the reported point), and the notification can include an option to allow a user of the mobile device to refute the reported point. The display of the second modified score can (in some instances) depend on any such refutation. For example, the second modified score can be presented in a different format (or can be withheld from presentation) during a time during which a user has an opportunity to refuse the point or during which a point-refute refutation is being analyzed.

Thus, a score presented on a particular device can depend both on input from a user of the device and a signal from another device. This can allow multiple mobile devices (e.g., each corresponding to a player) to synchronize their scores and yet recognize local user input.

The following examples provide illustrations of how devices can interact to facilitate continuous music play.

Example 1

A first player nears a sports complex. He opens a scorekeeping app using a first wearable device and selects a game of interest as being "Tennis". He selects "Find opponent". The first wearable device determines its GPS location and sends the location to a remote server. The remote server searches for other devices with nearby GPS locations, for which a respective user also indicated an interest in Tennis and for which a respective user is not currently partaking in scorekeeping via the app. For each other device, a username is identified along with a self-reported skill level. The remote server sends the information to the first wearable device.

The first wearable device displays a list of the identified usernames and associated skill levels. The first player selects a username associated with a second player and a second wearable device. A game-play request (or—in the tennis context—a match request) is sent from the first wearable device to the second wearable device. The first pair of goggles receives a response from the second pair of goggles indicating that the request was accepted.

Each wearable device initializes a score. The initial score includes a 0-0 set count, a 0-0 game count, a 0-0 point count and a 0 serve count. Each of these score features is represented on a display of each wearable device.

The first wearable device receives a communication indicating that the second user reported that he has scored a point. The first wearable device displays a notification indicative of the point report. When no responsive input is received during a post-notification time period, the first wearable device concludes that the point report was accurate, and adjusts the point count to 0-15. The adjusted score is displayed to the first user on a display of the first device.

Subsequently, the first wearable device detects input from the first player indicating that the first user scored a point. The first wearable device generates a first communication (that includes, e.g., an alleged scoring party and/or a point increment) and sends the first communication to the second device. It further adjusts the displayed point count to 15-15, but the first 15 is blinking to indicate that the score adjustment is pending and could change depending on whether the second player objects to the adjustment. If no refutation information is received from the second device (e.g., during a time period or before a subsequent action), the second modified score can be accepted, and the 15 can stop blinking.

The first wearable device detects another input from the first player indicating that the first user scored a point. The first wearable device generates a second communication (that includes, e.g., an alleged scoring party and/or a point increment) and sends the second communication to the second device. It further adjusts the displayed point count to 30-15, with the 30 blinking. The first wearable device receives a third communication that indicates that the second user had indicated that no score was to be awarded due to a fault. The first wearable device can access a rule that indicates, in circumstances where one player reports a point and the other reports a fault, the play is to be ignored, such that no fault is recognized and no point is awarded. The first wearable device adjusts the displayed point count to return to 15-15. The second wearable device can access a same rule via the app, such that the displayed point counts are consistent between the wearable devices.

Example 2

Using an app, a first player schedules a volleyball game. Specifically, the first player identifies a time of the game, a location of the game and a set of usernames. The app identifies information for a central server located at or near the game's location. A reservation request is then sent to a central server, and a reservation confirmation is received. Using a remote data store, the app identifies an email address for each of the set of usernames. The app causes an invitation to participate in the game to be sent to each identified email address.

Thirty minutes prior to the game time, the central server begins determining whether any devices that it detects on a short-range BT-LE network correspond to a username in the set of usernames. Upon any such detection, the central server pairs to the device. A second player enters input into her smartphone indicating that the game is beginning. Devices that are executing a scorekeeping app can participate in communications with the central server (e.g., such that a phone not running the app can refuse pairing with the central server). The central server requests and collects location information from each device and uses the location information to group the detected devices into teams (e.g., based on stored data about a net location and assuming that team members will be on a same side of the net). The central server concludes that three devices (the first device, the second device and a third device) are associated with a first team and two devices (a fourth device and a fifth device) are associated with a second team. Each team, in actuality, includes additional team members beyond those detected.

The central server initializes a score, which includes a 0-0 game count and a 0-0 point count. The central server pushes the score to each of the five devices, and the five devices display the score.

A third player presses a point-increment button displayed on a touchscreen of the third device. Upon pressing the button, the third device presents additional options that allow the third player to indicate which team scored the point. Further, the list of usernames associated with the game is presented (along with an "other" option), such that the fourth player can identify a particular player who scored the point. The third player enters input indicating that the second team scored the point and leaves the player-identification blank. The third device sends a first point-reporting communication to the central server reporting the point and identifying the scoring team.

The central server sends a pending-score-adjustment notification to all paired devices that reflects the same information. Upon receiving the notification, each device displays the information and presents an option to object to the report. No objection is received within 30 seconds from the notification transmission. The central server then updates the point count to be 0-1 and pushes the updated score to each paired device. All paired devices then display the updated score.

Subsequently, the first player presses a point-increment button displayed on a touchscreen of the first device. The first player navigates through subsequent steps to indicate that "Melissa" on the first team scored a point. The first device sends a first point-reporting communication to the central server reporting the point and identifying the scoring team. The central server sends a pending-score-adjustment notification to all paired devices that reflects the same information. Upon receiving the notification, each device displays the information and presents an option to object to the report.

A fourth and fifth player interacts with the respective fourth and fifth device to indicate an opinion that the first team did not score a point, and that instead, the second team scored the point. The central server accesses a rule that indicates that inconsistencies are to be resolves to align with a popular vote, when a majority opinion exists. The central server then updates the point count to be 0-2 and pushes the updated score to each paired device. All paired devices then display the updated score.

Example 3

Using an app, two of four players select (using a mobile phone) "Bridge" as a game type using a scorekeeping app. Each mobile phone then scans for other nearby devices viewable on a short-range network. The first device detects six devices and lists each of the six devices' names and an associated signal strength to a first player. The first player selects the name of the second device, which initiates pairing between the two devices.

The first player indicates that the second player is a team member on "Team 1". The app prompts one or both users to identify a bid and declaring side. The first player indicates that Team 1 is a declaring side and that a level of a bid is 7 and a denomination is hearts. The app initializes a trick score as being 0-0 and causes an increment button (e.g., a "+") to be shown in correspondence with each team.

The second player enters an input to the app self-identifying herself as being a storekeeper. The second player presses the Team-2 increment button to indicate that Team 2 won the first trick. The second device identifies an adjusted trick score as being 0-1 and sends a first communication including the adjusted score to the first device. Both devices display the updated score.

The second player presses the Team-2 increment button two additional times. The second device identifies an adjusted trick score as being 0-3 and sends a second communication including the adjusted score to the first device. Both devices display the adjusted score.

The first player presses a "correction" button on a display of the first device. An interface on the first device appears and allows the first player to adjust either number in the score. The first player adjusts the score to be 0-2. The first device sends a third communication including the manually adjusted score to the second device. An interface on the second device allows the second player to accept or reject the correction. A rule indicates that the second player's decision is final, due to her designation as being the scorekeeper. The second player selects the accept option. The second device then adjusts the trick score to 0-2 and sends a fourth communication to the first device with the adjusted score. Both devices display the adjusted score.

The first player enters input via an app interface requesting that the she be designated as the scorekeeper. A fifth communication with a scorekeeper-change request is sent to the second device. The second player grants the request and the scorekeeper designation is appropriately changed.

The first player periodically reports subsequent trick results. The app then detects that 13 trick points have been awarded. The app calculates a score for the hand based on the bid and the trick history.

Example 4

Each of twenty users open a running app on a mobile device and subsequently begin running. Each device repeatedly sends its coordinates to a remote device. The remote device detects that the users are proximate to each other and estimates that the users are participating in a same race or training.

Communications are repeatedly pushed from the remote device to each of the devices that identify the location and speed of the twenty devices. Each device displays this information (e.g., by positioning, on a map, a representation of a device at a position corresponding to its location and by color-coding the representation based on its speed). Using the location information, a first device determines its ranking relative to the other nineteen devices. A first ranking indicates that the first device is in seventh place amongst the twenty devices. However, the ranking dynamically changes as the location of the first device and/or other devices change. A second ranking indicates that the first device is in fifteenth place.

Embodiments of the present invention can facilitate cooperative, consistent and accurate scorekeeping. The capability of aggregating inputs from multiple user devices can provide the ability to avoid tasking any individual player with an entire scorekeeping responsibility. Multiple users can report points, such that individual points are less likely to be forgotten. Further, point reports from one player can be monitored by others, such that disputes are quickly addressed and appropriately resolved. Embodiments of the present invention can further provide convenient identification of devices to include in a given scorekeeping effort, using GPS coordinates of devices or presence on a short-range network. The devices can interact directly or through a server (e.g., a central server located at a game-play location or a remote server).

While the invention has been described with respect to specific embodiments, one skilled in the art will recognize that numerous modifications are possible. For example, different sensors or combinations of sensors can be substituted for those described herein. A variety of different mobile devices and wearable devices can be used.

Some described embodiments refer to an athletic game or a competitive game or event. It will be appreciated that, in some embodiments, the application can be extended to any application that can include a performance metric that can be adjusted by input received from different users (e.g., one, two or each user being a participant in an associated activity). Embodiments can, for example, relate to card games (e.g., pinochle, poker or bridge), board games, individual competitive events (e.g., track events), and/or group non-competitive events (e.g., a run for a running club).

It will further be appreciated that a scorekeeping app, as described herein, can have other functionalities beyond those described and/or can be part of another app. For example, in addition to scorekeeping functionalities described herein, the scorekeeping app or another associated app, can track performances of individual players and/or monitor progression of a game (e.g., to determine when a team's performance degraded). Such monitoring and tracking can be used to determine patterns or statistics that can be presented to a user and/or used to determine recommendations for performance improvement.

Some disclosures herein refer to adjusting a score based on manual input from a user. In some instances, sensor data can instead or additionally be used. In one instance, the sensor data can be used to identify a point's occurrence. For example, a video camera on a central device can determine whether a point was scored and/or who is to be credited with the point (e.g., by assessing whether a tennis ball landed outside of a court line). Users can be provided with an opportunity to refute the determination. In one instance, the sensor data can be used to monitor play progress. For example, an accelerometer in a device can be used to determine whether play has continued after a previous point (e.g., a new down in football or a new serve in tennis or volleyball).

Some described embodiments pertain to establishing or using a pairing or other connection that enables devices to recognize each other as being authorized for interoperation. This can reduce the likelihood that a mobile device not suited to participate in scorekeeping (e.g., a mobile device of a player of another game or a mobile device of a bystander) will be automatically be included in a scorekeeping activity. Security, such as Bluetooth security, can be utilized to provide score communication sessions.

Disclosures herein pertaining to players can be further applied to coaches. For example, a direct or indirect communication channel can be established between a device of a coach and one or more respective player devices (e.g., of players being coached by the coach) or between a device of a coach and a device of another coach. In one instance, a coach can be allowed to act as a proxy for a player. For example, the coach can then schedule a game for the player (and/or a team) to participate in. As another example, the coach can then be tasked to track and monitor a score rather than (or in addition to) the player.

It will be appreciated that, in some instances, disclosures herein can be modified to apply to tracking a parameter of an event in a general, non-game and/or non-sports context. That is, disclosures can be applied to a variety of other situations in which multiple parties coordinate to track a parameter of interest. Such applications could include, e.g., tracking a bid in an auction, tracking a fundraising amount, tracking a vote count, tracking a sales quantity, tracking a version number of a document or file or tracking specific songs or a quantity of songs in a collaborative playlist.

Individuals can enter input via a respective device to indicate that a parameter is to be updated (e.g., a bid is to be submitted, a count or amount is to be incremented, etc.), and a display of a device of another individual can be updated to, e.g., reflect an updated parameter, request confirmation of the parameter, invite opposition to an update, etc. The input can include an indication that the parameter is to be an updated and/or an indication as to an amount as to which the parameter is to be updated. Parties can include those who are or have the potential to influence the parameter and/or parties that observe the parameter or events that can influence the parameter.

The foregoing description may make reference to specific examples of a wearable device (e.g., a wearable device) and/or a mobile device (e.g., a mobile phone or smart phone). It is to be understood that these examples are illustrative and not limiting; other devices can be substituted and can implement similar functional blocks and/or algorithms to perform operations described herein and/or other operations. For example, another type of wearable device (such as a pair of glasses, a clip, an armband, a belt and/or a watch) can be used. Further, some or all of the player devices can be non-wearable and/or non-mobile.

It will be appreciated that, while disclosures herein can refer to tracking a score, embodiments can alternatively or additionally be modified to coordinate, track or increment one or more other parameters related to, e.g., a game or event. For example, the parameter can include a penalty status, such that user input can pertain to whether a foul occurred, who performed the foul and/or an appropriate penalty. As another example, the parameter can include a status of a game, such as whether a serve occurred (e.g., in tennis or volleyball) and/or a result of the serve, whether a pitch was thrown and/or a result of the pitch (e.g., a strike, ball or foul), whether a down occurred and/or a result of the down, and/or whether a race-increment (e.g., lap or race) was completed and/or a player or time associated with the completion. Tracking a parameter can, in some instances, include incrementing a tracked quantity (e.g., by an incremental-change amount, which may or may not be fixed). Modifications to the parameter can occur in accordance with one or more rules that can, e.g., be generally applicable to a game of a given type or can depend on a game characteristic (e.g., a league, team, player or age bracket). In some instances, a rule can be defined based on input from one or more players in the game (e.g., received via their respective devices).

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
    receiving, at a first electronic device, a first communication from a second electronic device;
    updating, at the first electronic device, a tracked parameter of a game based on the first communication;
    causing the tracked parameter of the game to be displayed;
    receiving, at the first electronic device, an indication that the tracked parameter of the game is to be changed, wherein the indication is received from a device other than the second electronic device;
    sending, from the first electronic device, a second communication to the second electronic device reflecting the indication that the tracked parameter of the game is to be changed; and
    receiving, at the first electronic device, a third communication from the second electronic device, wherein the third communication includes data indicating that the indicated changing of the tracked parameter is disputed.

2. The method of claim 1, wherein the game includes an athletic game, and wherein the tracked parameter includes a score or penalty status.

3. The method of claim 1, wherein:
    each of the first electronic device and the second electronic device includes a mobile electronic device,
    receiving the indication that the tracked parameter of the game is to be changed includes receiving an input from a user of the first electronic device that is indicative that the tracked parameter of the game is to be changed, and
    causing the tracked parameter of the game to be displayed includes causing the tracked parameter of the game to be displayed on a display of the first electronic device.

4. The method of claim 1, wherein:
    the first electronic device includes a server,
    the second electronic device includes a mobile electronic device,
    receiving the indication that the tracked parameter of the game is to be changed includes receiving a fourth communication from a third mobile electronic device that is indicative of a change in a game parameter, and
    causing the tracked parameter of the game to be displayed includes causing the tracked parameter of the game to be displayed on the second electronic device.

5. A method comprising:
    establishing a communication channel between a first electronic mobile device and a second electronic mobile device;
    generating, at the first electronic mobile device, a representation of a sports game, wherein the representation is indicative that each of a first user of the first electronic mobile device and a second user of the second electronic mobile device is a player in the sports game;
    receiving, at the first electronic mobile device, a communication from the second electronic mobile device;
    modifying a parameter for the sports game based on the communication; and
    presenting the modified parameter in association with the representation of the sports game on the first electronic mobile device.

6. The method of claim 5 wherein the first electronic mobile device includes a band that is configured to be worn around a body part of the first user.

7. The method of claim 5 further comprising:
    receiving, at the first electronic mobile device, input from the first user; and
    modifying the parameter of the sports game based on the input.

8. An electronic device comprising:
    an input component;
    an output component configured to transmit communications to other devices;
    one or more processors coupled to the input component and to the output component; and
    a computer-readable storage medium containing instructions, that, when executed by the one or more processors, cause the one or more processors to:
        receive a first communication from a second electronic device;
        update a tracked parameter of a game based on the first communication;
        cause the tracked parameter of the game to be displayed;
        receive, via the input component, an indication that the tracked parameter of the game is to be changed, wherein the indication is received at a device other than the second electronic device;
        send, via the output component, a second communication to the second electronic device reflecting the indication that the tracked parameter of the game is to be changed; and
        receive a third communication from the second electronic device, wherein the third communication includes data indicating that the indicated changing of the tracked parameter is disputed.

9. The electronic device of claim 8, wherein the game includes an athletic game, and wherein the tracked parameter includes a score or penalty status.

10. The electronic device of claim 8, further comprising a display, wherein:
    each of the electronic device and the second electronic device includes a mobile electronic device,
    receiving the indication that the tracked parameter of the game is to be changed includes receiving an input from a user of the electronic device that is indicative that the tracked parameter of the game is to be changed, and
    causing the tracked parameter of the game to be displayed includes causing the tracked parameter of the game to be displayed on the display of the electronic device.

11. The electronic device of claim 8, wherein:
    the electronic device includes a server,
    the second electronic device includes a mobile electronic device, receiving the indication that the tracked parameter of the game is to be changed includes receiving a fourth communication from a third mobile electronic device that is indicative of a change in a game parameter, and causing the tracked parameter of the game to be displayed includes causing the tracked parameter of the game to be displayed on the second electronic device.

12. A computer-program product tangibly embodied in a non-transitory machine-readable storage medium, including instructions configured to cause one or more data processors to perform actions including:
receiving, at a first electronic device, a first communication from a second electronic device;
updating, at the first electronic device, a tracked parameter of a game based on the first communication;
causing the tracked parameter of the game to be displayed;
receiving, at the first electronic device, an indication that the tracked parameter of the game is to be changed, wherein the indication is received from a device other than the second electronic device;
sending, from the first electronic device, a second communication to the second electronic device reflecting the indication that the tracked parameter of the game is to be changed; and
receiving, at the first electronic device, a third communication from the second electronic device, wherein the third communication includes data indicating that the indicated changing of the tracked parameter is disputed.

13. The computer-program product of claim 12, wherein the game includes an athletic game, and wherein the tracked parameter includes a score or penalty status.

14. The computer-program product of claim 12, wherein:
each of the first electronic device and the second electronic device includes a mobile electronic device,
receiving the indication that the tracked parameter of the game is to be changed includes receiving an input from a user of the first electronic device that is indicative that the tracked parameter of the game is to be changed, and
causing the tracked parameter of the game to be displayed includes causing the tracked parameter of the game to be displayed on a display of the first electronic device.

15. The computer-program product of claim 12, wherein:
the first electronic device includes a server,
the second electronic device includes a mobile electronic device,
receiving the indication that the tracked parameter of the game is to be changed includes receiving a fourth communication from a third mobile electronic device that is indicative of a change in a game parameter, and
causing the tracked parameter of the game to be displayed includes causing the tracked parameter of the game to be displayed on the second electronic device.

16. A computer-program product tangibly embodied in a non-transitory machine-readable storage medium, including instructions configured to cause one or more data processors to perform actions including:
establishing a communication channel between a first electronic mobile device and a second electronic mobile device;
generating, at the first electronic mobile device, a representation of a sports game wherein the representation is indicative that each of a first user of the first electronic mobile device and a second user of the second electronic mobile device is a player in the sports game;
receiving, at the first electronic mobile device, a communication from the second electronic mobile device;
modifying a parameter for the sports game based on the communication; and
presenting the modified parameter in association with the representation of the sports game on the first electronic mobile device.

17. The computer-program product of claim 16, wherein the actions further include:
receiving, at the first electronic mobile device, input from the first user; and
modifying the parameter of the sports game based on the input.

* * * * *